US010708823B2

(12) United States Patent
Condeixa

(10) Patent No.: US 10,708,823 B2
(45) Date of Patent: Jul. 7, 2020

(54) SYSTEMS AND METHODS FOR COOPERATIVE, DYNAMIC, AND BALANCED ACCESS TO THE INFRASTRUCTURE SUPPORTING THE NETWORK OF MOVING THINGS, FOR EXAMPLE INCLUDING AUTONOMOUS VEHICLES

(71) Applicant: Veniam, Inc., Mountain View, CA (US)

(72) Inventor: Tiago Condeixa, Aveiro (PT)

(73) Assignee: VENIAM, INC., Mountain View, CA (US)

( * ) Notice: Subject to any disclaimer, the term of this patent is extended or adjusted under 35 U.S.C. 154(b) by 165 days.

(21) Appl. No.: 15/854,290

(22) Filed: Dec. 26, 2017

(65) Prior Publication Data
US 2018/0343587 A1    Nov. 29, 2018

Related U.S. Application Data

(60) Provisional application No. 62/510,010, filed on May 23, 2017.

(51) Int. Cl.
| *H04W 28/26* | (2009.01) |
| *H04W 4/44* | (2018.01) |
| *H04L 29/08* | (2006.01) |
| *H04W 4/02* | (2018.01) |
| *H04W 84/00* | (2009.01) |
| *H04W 28/16* | (2009.01) |
| *H04W 4/029* | (2018.01) |

(52) U.S. Cl.
CPC ............. *H04W 28/26* (2013.01); *H04L 67/12* (2013.01); *H04W 4/027* (2013.01); *H04W 4/44* (2018.02); *H04W 4/029* (2018.02); *H04W 28/16* (2013.01); *H04W 84/005* (2013.01)

(58) Field of Classification Search
CPC .................................................. H04W 28/26
See application file for complete search history.

(56) References Cited

U.S. PATENT DOCUMENTS

| 5,657,317 | A  | * | 8/1997  | Mahany ................ G06F 1/1626 370/338 |
| 9,179,367 | B2 | * | 11/2015 | Krishnaswamy ....... H04L 12/14 |
| 10,038,729 | B1 | * | 7/2018  | Ramalingam ......... H04W 48/12 |
| 10,148,824 | B2 | * | 12/2018 | Ganesan ................ H04L 12/14 |
| 10,159,022 | B2 | * | 12/2018 | Senarath ........... H04W 36/0072 |
| 2004/0198386 | A1 | * | 10/2004 | Dupray ................. H04W 64/00 455/456.1 |
| 2004/0235481 | A1 | * | 11/2004 | Shimizu ................ H04W 24/02 455/445 |

(Continued)

*Primary Examiner* — Andrew Lai
*Assistant Examiner* — Andrew C Lee
(74) *Attorney, Agent, or Firm* — McAndrews, Held & Malloy, Ltd.

(57) ABSTRACT

Communication network architectures, systems and methods for supporting a network of mobile and/or static nodes, including for example autonomous vehicles. As a non-limiting example, various aspects of this disclosure provide communication network architectures, systems, and methods that provide for cooperative, dynamic, and balanced access to the communication network infrastructure supporting the Network of Moving Things.

25 Claims, 13 Drawing Sheets

(56) References Cited

U.S. PATENT DOCUMENTS

| | | | |
|---|---|---|---|
| 2005/0065779 A1* | 3/2005 | Odinak | G10L 15/30 704/201 |
| 2005/0260997 A1* | 11/2005 | Korale | H04W 28/24 455/452.2 |
| 2006/0056373 A1* | 3/2006 | Legg | H04W 72/1247 370/341 |
| 2007/0027886 A1* | 2/2007 | Gent | G06Q 10/109 |
| 2008/0052719 A1* | 2/2008 | Briscoe | H04L 41/0806 718/104 |
| 2009/0252134 A1* | 10/2009 | Schlicht | H04L 1/0015 370/338 |
| 2010/0142448 A1* | 6/2010 | Schlicht | H04W 28/021 370/328 |
| 2010/0234071 A1* | 9/2010 | Shabtay | H04B 7/0408 455/562.1 |
| 2013/0107703 A1* | 5/2013 | Cherian | H04W 48/12 370/230 |
| 2013/0322329 A1* | 12/2013 | Visuri | H04W 48/16 370/328 |
| 2014/0003261 A1* | 1/2014 | Gillett | H04W 48/04 370/252 |
| 2014/0066013 A1* | 3/2014 | Mascarenhas | H04W 12/06 455/411 |
| 2014/0122695 A1* | 5/2014 | Kulikov | H04L 41/5054 709/224 |
| 2015/0120520 A1* | 4/2015 | Prokopenko | G06Q 30/04 705/34 |
| 2015/0222708 A1* | 8/2015 | Addepalli | H04W 72/0406 709/217 |
| 2017/0208632 A1* | 7/2017 | Gunasekara | H04L 12/14 |
| 2019/0090174 A1 | 3/2019 | Rocci et al. | |

* cited by examiner

SYSTEMS AND METHODS FOR COOPERATIVE, DYNAMIC, AND BALANCED ACCESS TO THE INFRASTRUCTURE SUPPORTING THE NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/510,010, filed on May 23, 2017, and titled "Systems and Methods for Cooperative, Dynamic, and Balanced Access to the Infrastructure Supporting the Network of Moving Things, for example Including Autonomous Vehicles," which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
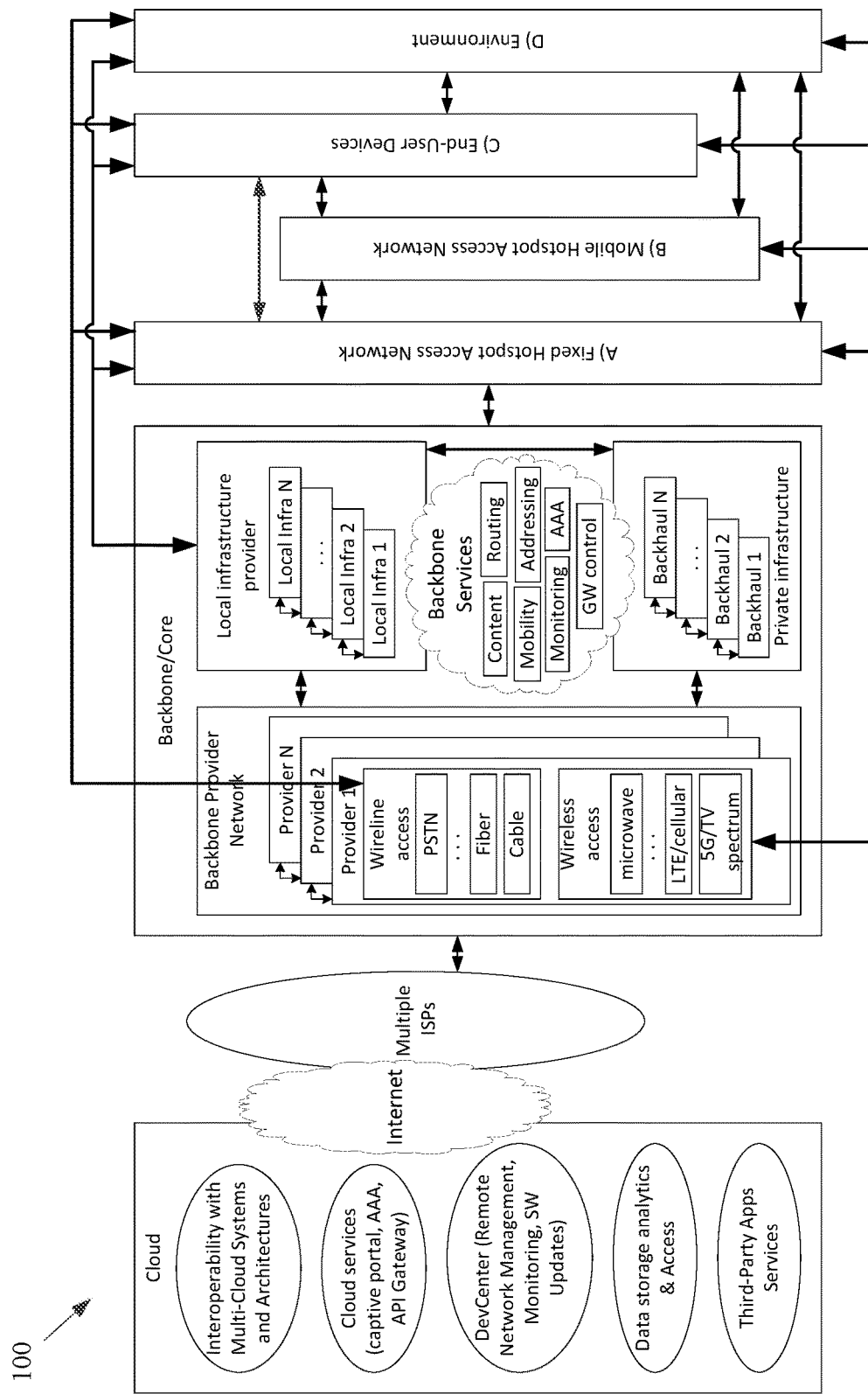
FIG. 1 shows a block diagram of a communication network, in accordance with various aspects of this disclosure.

Various aspects of this disclosure provide communication network architectures, systems and methods for supporting a network of mobile and/or static nodes, for example including autonomous vehicles. As a non-limiting example, various aspects of this disclosure provide communication network architectures, systems, and methods that provide for cooperative, dynamic, and balanced access to the communication network infrastructure supporting the Network of Moving Things.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10x the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, method steps, systems, networks, and/or network components 200, 300, 400, 500-570, 600, 700, 800, 900, 1000, and 1100, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
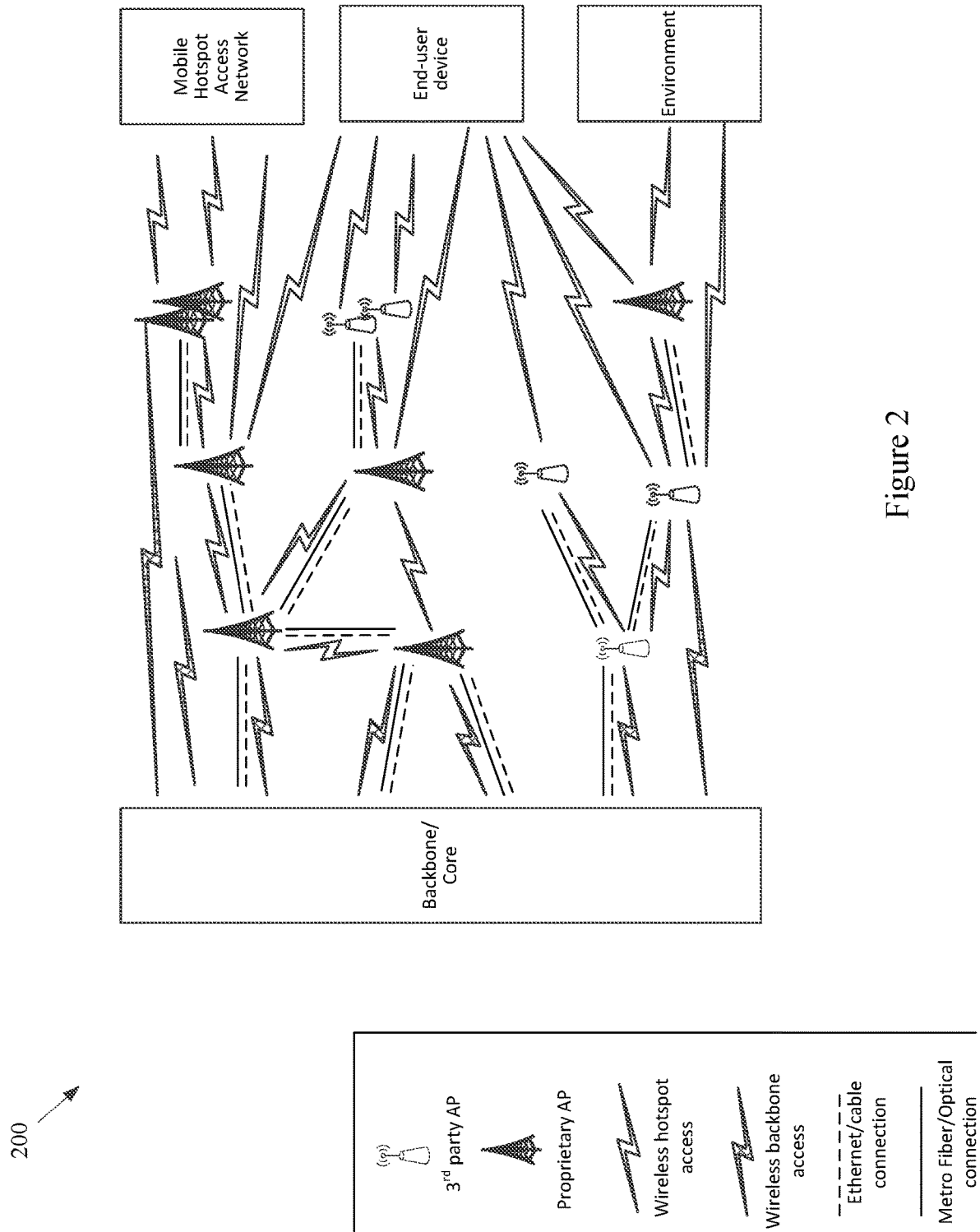
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, method steps, systems, networks, and/or network components 100, 300, 400, 500-570, 600, 700, 800, 900, 1000, and 1100, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
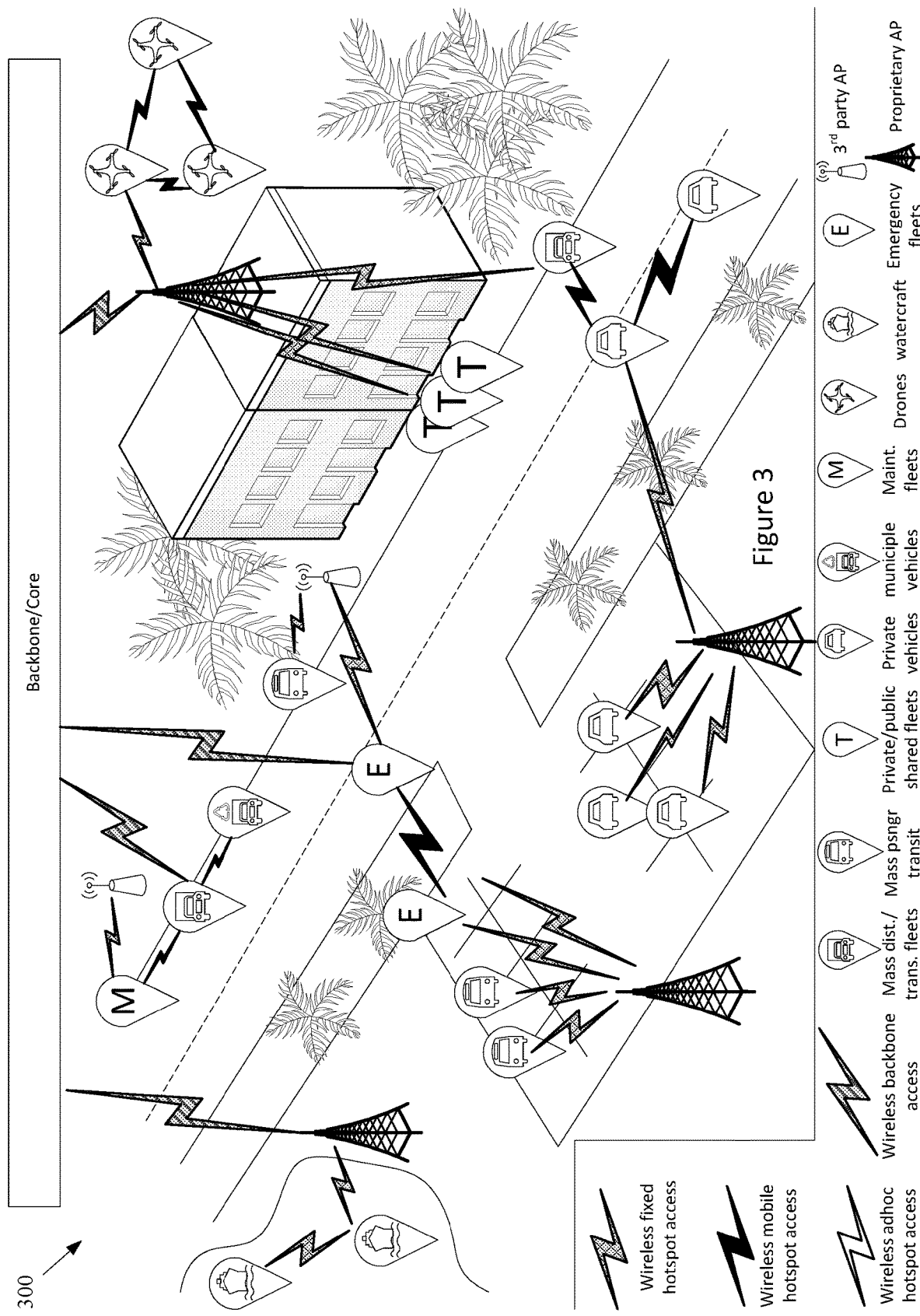
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, method steps, systems, networks, and/or network components 100, 200, 400, 500-570, 600, 700, 800, 900, 1000, and 1100, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
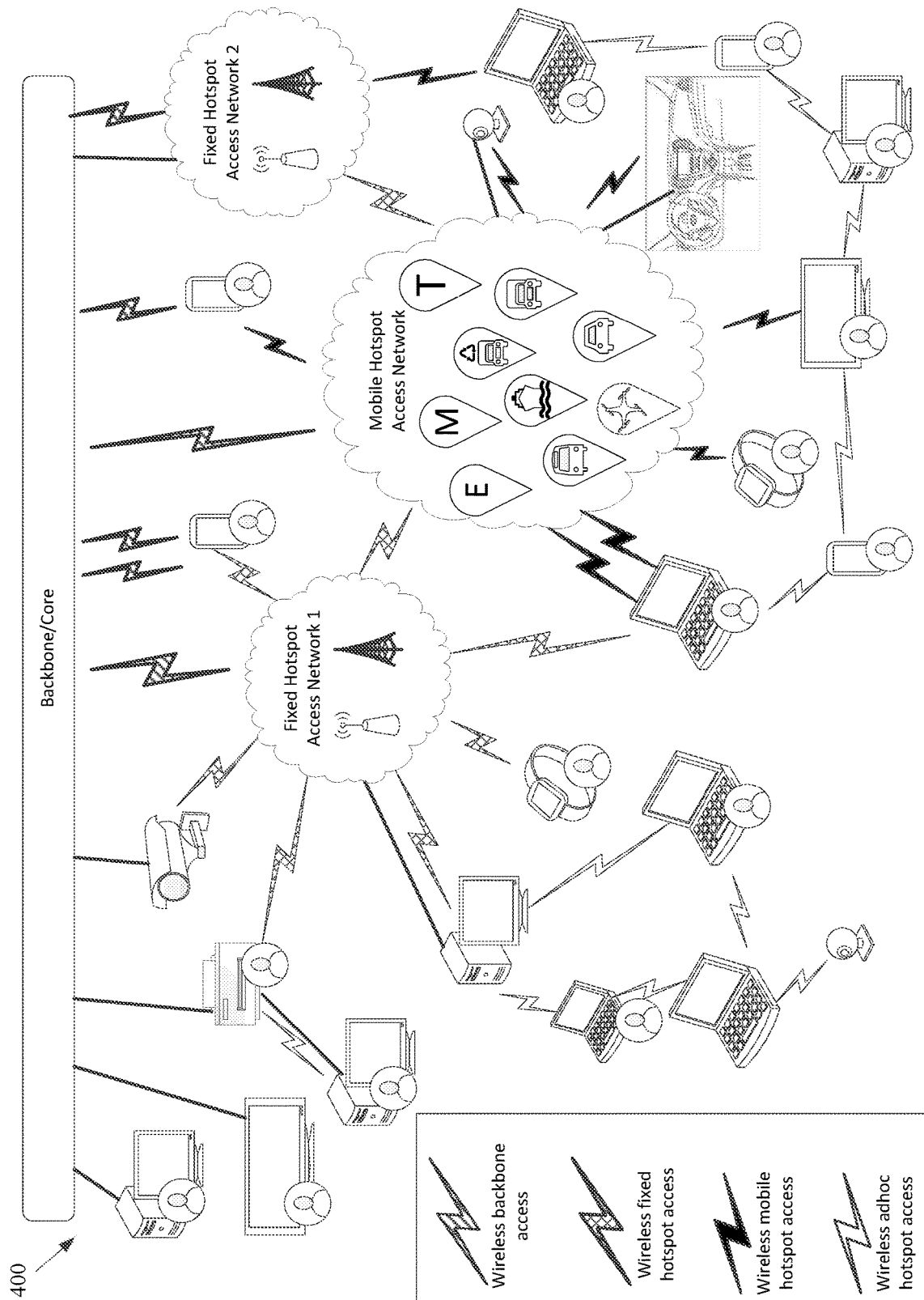
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, method steps, systems, networks, and/or network components 100, 200, 300, 500-570, 600, 700, 800, 900, 1000, and 1100, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
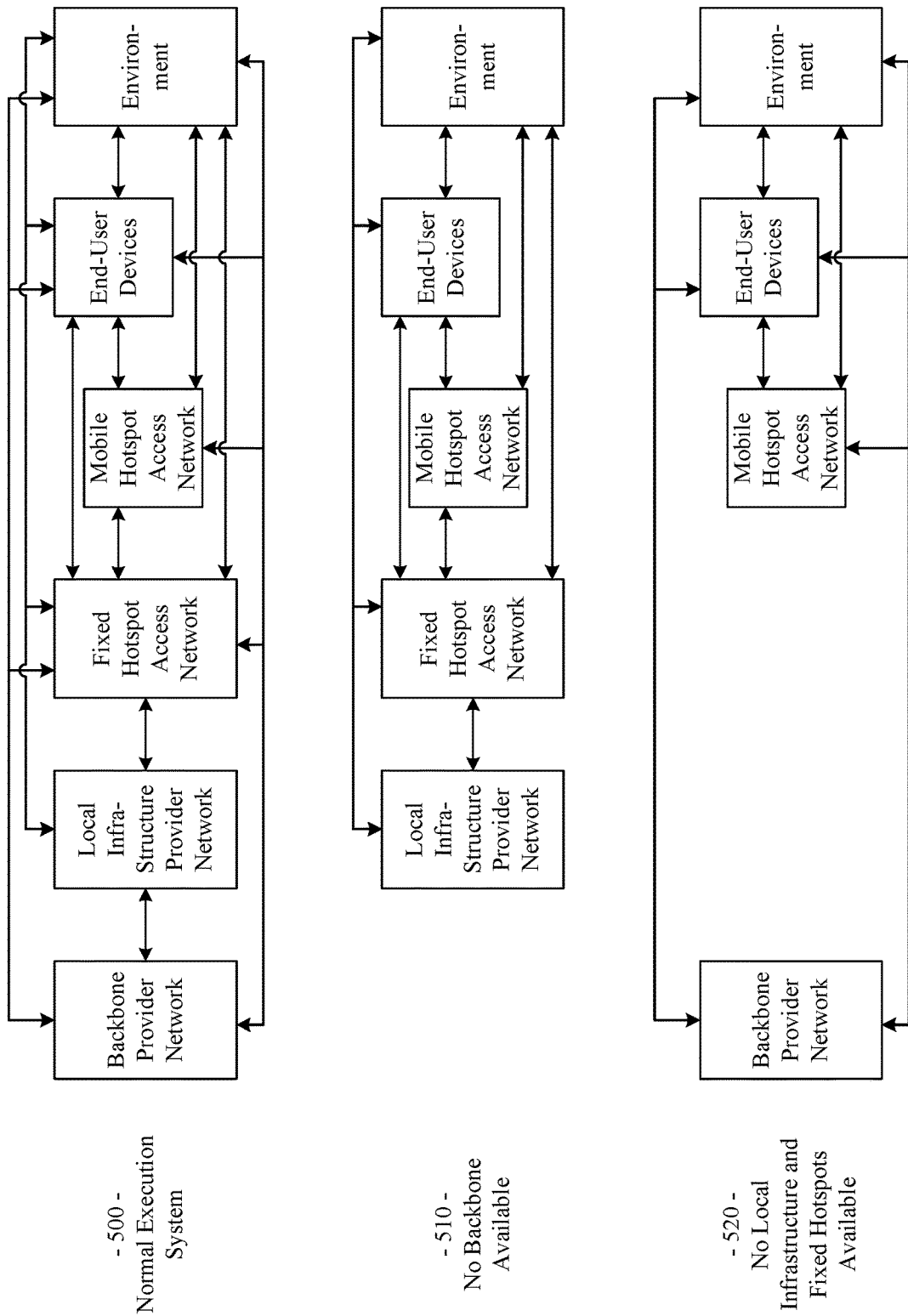
FIGS. 5A-5C show a plurality of network configurations illustrating the flexibility and/or and resiliency of a communication network, in accordance with various aspects of this disclosure.
Figure 5B:
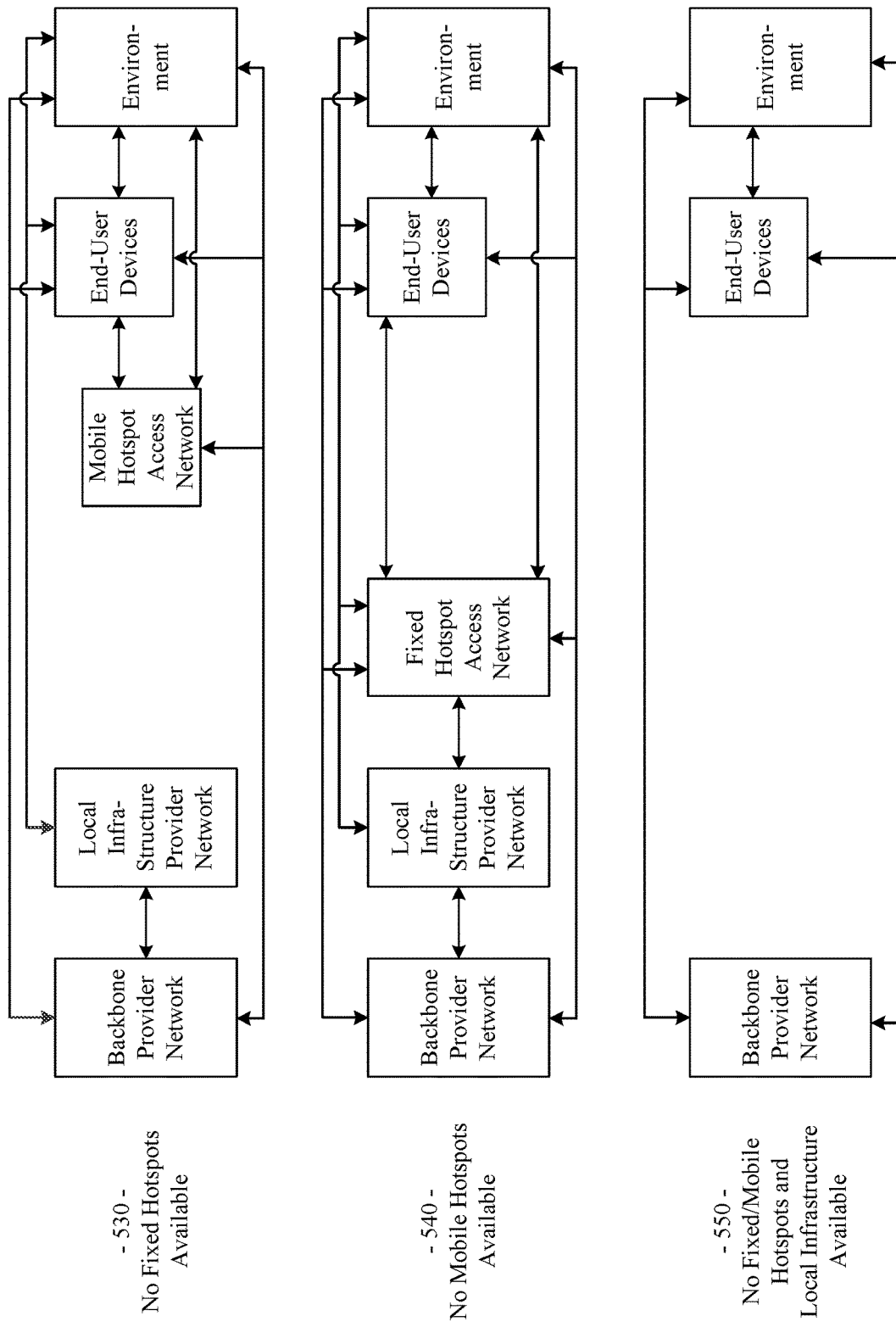
Figure 5C:
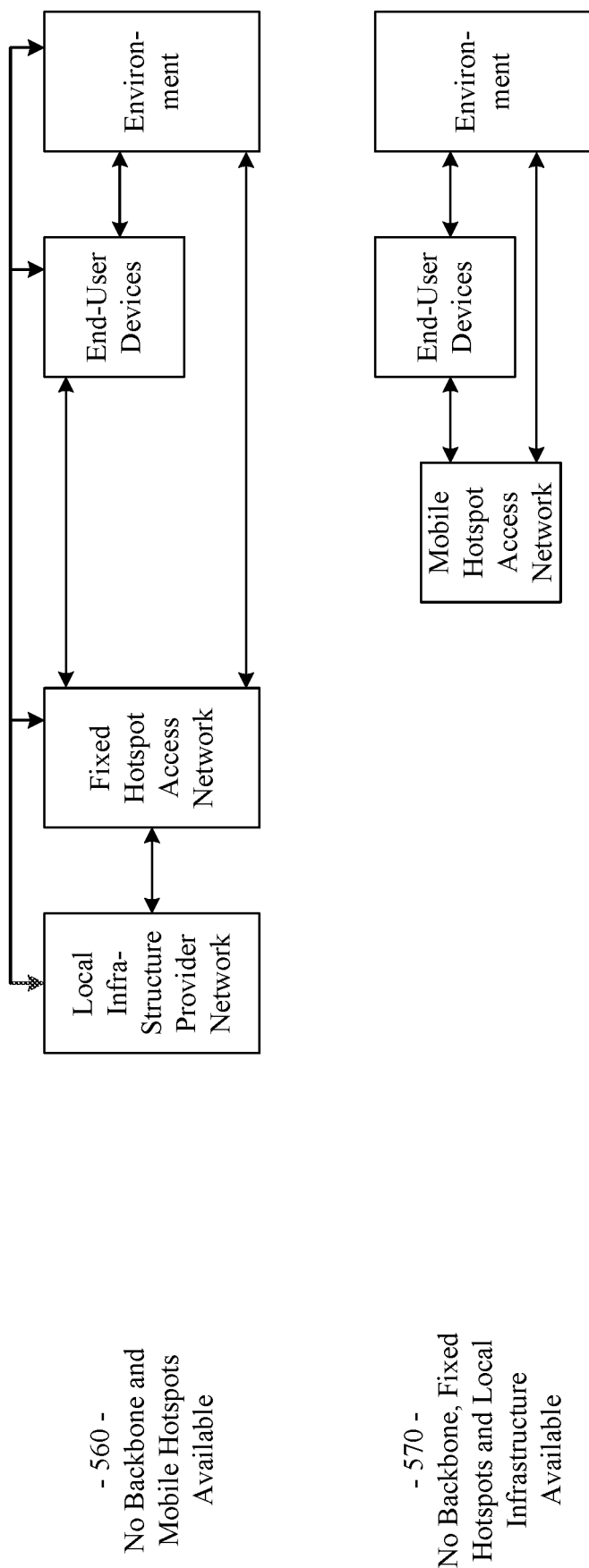

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, method steps, systems, networks, and/or network components 100, 200, 300, 400, 600, 700, 800, 900, 1000, and 1100, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
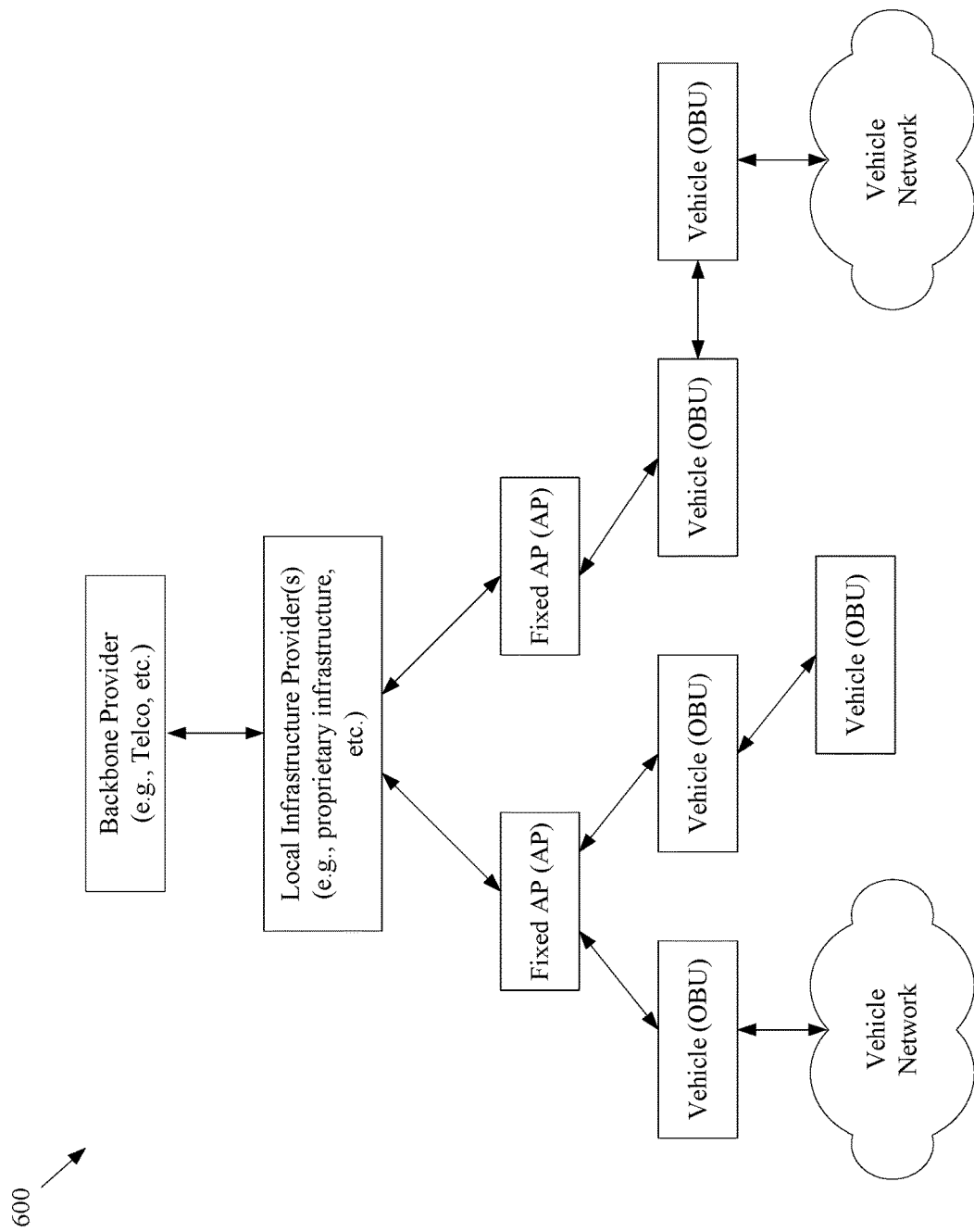
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, method steps, systems, networks, and/or network components 100, 200, 300, 400, 500-570, 700, 800, 900, 1000, and 1100, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
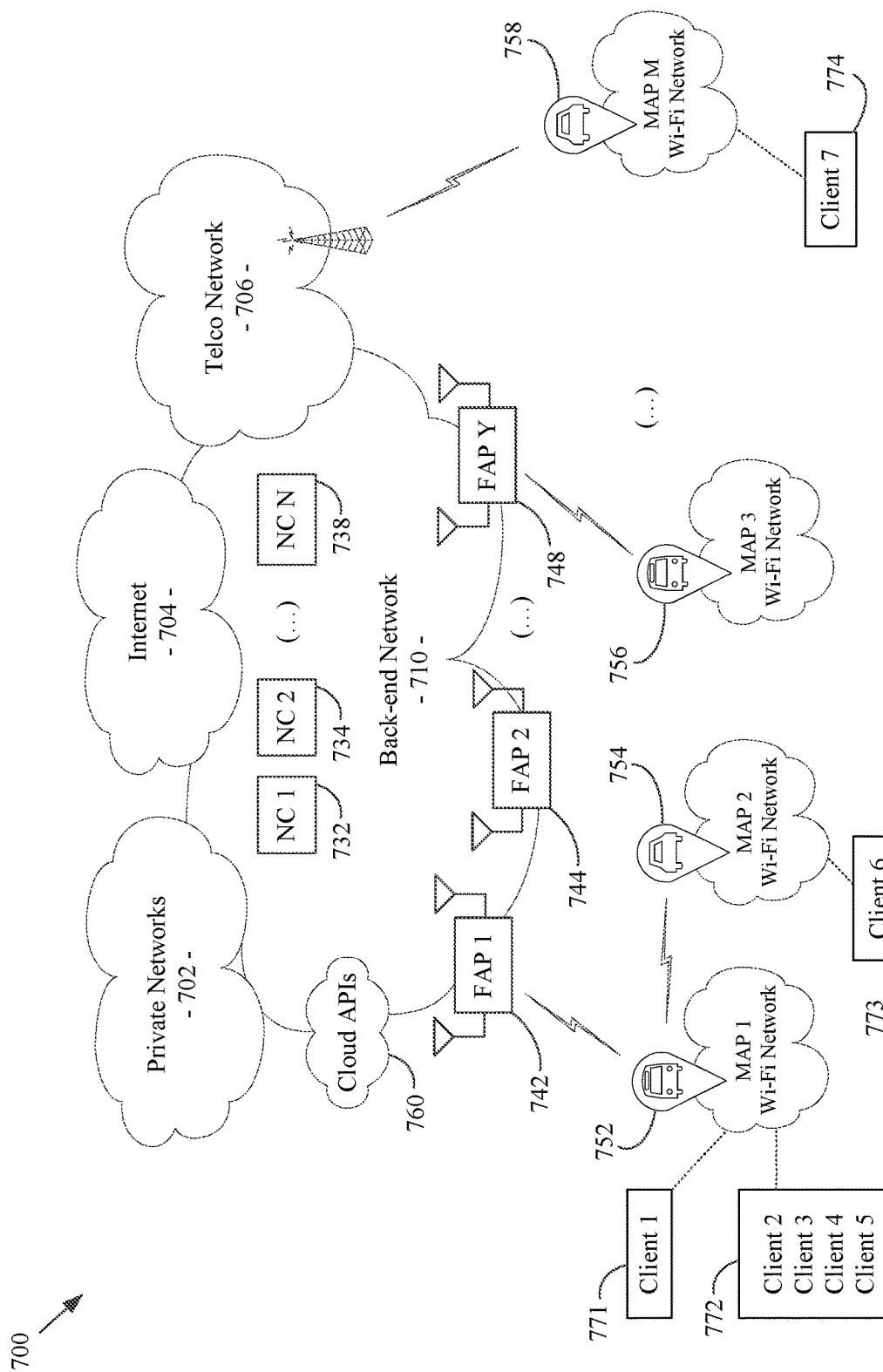
FIG. 7 shows still another block diagram of an example communication network 700, in accordance with various aspects of the present disclosure.

FIG. 7 shows still another block diagram of an example communication network 700, in accordance with various aspects of the present disclosure. The example network 700 may, for example, share any or all characteristics with the other example methods, method steps, networks and/or network components 100, 200, 300, 400, 500-570, 600, 800, 900, 1000, and 1100, discussed herein. Notably, the example network 700 shows a plurality of vehicles (or Mobile APs, or MAPs, or OBUs) 752, 754, 756, and 758, each communicatively coupled to a Fixed AP (or RSU) 742, 744, and 748 and/or a cellular network 706, where each Mobile AP may provide network access to a vehicle network (e.g., comprising other vehicles or vehicle networks, user devices, sensor devices, etc.), for example a Wi-Fi network to which end user devices (or other client devices) may connect, with which communication with sensors (or other client devices) may be performed, etc. The example network 700 may also, for example, comprise a plurality of Network Controllers 732, 734, and 738. The example network 700 may also, for example, comprise any of a variety of interconnected networks (e.g., Private Networks 702, the Internet 704, Telecommunication Networks 706, etc.). One or more servers of the Cloud may, for example, be accessible via Cloud APIs 760.

The Mobile APs 752, 754, 756, and 758 may, for example, be communicatively coupled to various client devices (e.g., end user devices, sensor devices, etc.), for example as the Mobile APs are within range of such client devices. For example, in the example scenario shown in FIG. 7, a first MAP 752 is communicatively coupled to a first client device 771 (e.g., Client 1) and a set of client devices 772 (e.g., Client 2, Client 3, Client 4, and Client 5), which may for example be co-located; a second MAP 754 is communicatively coupled to a sixth client device 773 (e.g., Client 6); and an $M^{th}$ MAP 758 is communicatively coupled to a seventh client device 774 (e.g., Client 7). The Mobile APs may, for example move in and out of communication range of the various client devices, various client devices may travel with the Mobile APs (e.g., for at least a transportation time period), etc. The Mobile APs may, for example when in-range of such client devices, communicate with such devices (e.g., provide 2-way communication links to end user devices, gather information from sensor devices, etc.) in a power-efficient and network-efficient manner, many examples of which are provided herein.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller (NC), may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

There are a substantial number of connections that are established within the network of moving things (NMT, IMT, etc.). Some of such connections generally need to be established (e.g., critical connections related with safety applications, real-time monitoring of critical situations or operation, autonomous vehicle control, etc.). Others of such connections may for example be delay tolerant (e.g., at least a certain amount of communication latency is acceptable), and/or may for example be implemented opportunistically (e.g., waiting for a low-cost or non-impactful communication pathway to become available, etc.). Still others of such connections may for example be implemented in a predictable or deterministic manner, while others may be implemented in an asynchronous manner. Various connections may also, for example, need to be performed (or are preferably performed) at a specific location, need to be performed (or are preferably performed) with a specific AP (e.g., Fixed AP, etc.), etc.

In an example scenario in which all of the devices and nodes start to send data without any knowledge about the environment, the Internet of Moving Things (IoMT) (or Network of Moving Things (NMT)) infrastructure may become saturated, overloaded, poorly-performing, etc. For example, in general, the nodes and/or devices that are generating data or requesting connectivity might not be aware of the features characterizing the infrastructure supporting the Network of Moving Things. Such lack of infrastructure awareness may for example result in poor connectivity decisions (e.g., from the perspective of the device or node, from the perspective of the infrastructure as a whole, from the perspective of other nodes, etc.). Accordingly, various aspects of the present disclosure provide for the devices (or nodes) to have (e.g., directly and/or directly) more knowledge and context, where such knowledge may then be utilized by the devices (or nodes) to make a more informed connectivity decision. There are many benefits of such informed decision-making, including for example eliminating or reducing unnecessary resource burden in the network, optimizing data communication costs, optimizing overall communication network efficiency, etc.

In an example implementation, as discussed herein, reward and/or penalty models may be deployed to (at least in part) govern overall operation or utilization of the communication network. Benefits may, for example, include reducing interference and congestion, improving communication quality, enhancing the user experience, and increasing the overall service performance.

An example implementation may, for example, comprise a distributed and cooperative system that includes any one or more of a variety of models, methods, and algorithms, many non-limiting examples of which are provided herein. For example, an example implementation may comprise a Model (e.g., data type, class, structure, etc.) to characterize the communication opportunities and/or resources (e.g., time slot, code slots, channels, etc.) available, which a node (which may also be referred to herein as an "offering node") may offer for communication. Such communication may, for example, be upstream and/or downstream, lateral, directly peer-to-peer, etc., and may involve the receiver (or sink) side, the transmitter (or source) side, etc.

An example implementation may also, for example, comprise a Model (e.g., data type, class, structure, etc.) to characterize the communications needs of a node (which may also be referred to herein as a "subscribing node") that wants to (or is willing to) use offered communication opportunities or resources of the network of moving things (e.g., as sender node, as a recipient node, etc.). The Model may, for example, provide for characterizing credits (or other measure of cost) that the nodes have to perform communications in a network. Such credits may, for example, be day-based, month-based, road or route-based, location-based, vehicle-based, fleet-based, user-based, situation-based, etc.

An example implementation may additionally, for example, comprise a Method that provides for a node to communicate (e.g., broadcast, multicast, unicast, etc.) or publish the communication resources (e.g., communication slot(s), channel, memory, etc.) that the node has available. An example implementation may further, for example, comprise a Method that provides for a node to subscribe to (or request) the communication resources (e.g., how many of the available slots, etc.) needed (or wanted) from the node(s) having the desired communication resources available.

An example implementation may also, for example, comprise an Algorithm (e.g., method flows, priorities, rules, cost functions, etc.) that may be implemented by one or more nodes to determine how a sender node will operate, how a receiver node will operate, which node of a plurality of nodes within range will serve another node, etc. For example, such an algorithm may specify how a best in-range Mobile AP (or vehicle) or Fixed AP is selected to provide a particular type of access or service (e.g., for communication of a particular type of data for a particular application), for example in a scenario in which more than one Mobile AP (or vehicle) may have requested data (or other desired resources).

An example implementation may additionally, for example, comprise an Algorithm (e.g., method flows, priorities, rules, cost functions, etc.) that may be implemented by one or more nodes to determine how to reward or penalize (or charge) each node for communicating immediately, communicating later in a delay-tolerant manner, allowing another node to utilize resources before the node utilizes such resources, sharing communication capabilities (or resources) with other nodes, etc.

An example implementation may further, for example, comprise a Method that provides for measuring and/or accounting the actual resource utilization (e.g., amount of data transferred, numbers of slots utilized, number and/or identify of nodes involved in the communication (e.g., in a multi-hop scenario, etc.), etc. The Method may, for example provide feedback, for example of resource utilization, to the overall system (e.g., to each node, to a central controller, to a Cloud server, etc.). Such information may, for example, comprise information of actual resource utilization (and/or resource subscription level), which may, for example, be utilized by any or all nodes of the network to adapt operation. For example, congested communication pathways may be re-allocated, underutilized resources may be re-assigned or designated as available for utilization by other nodes, etc. In an example scenario, the system may utilize such information to determine that resources are available for an additional node to utilize the network, where such node was previously not able to utilize the network. For example, resources may initially blocked from utilization based on a subscription to such resources, but upon realization that such resources are not being utilized or are being underutilized, such resources may become available or at least partially available.

Various aspects of the methods and systems described herein comprise systems and methods (e.g., models, methods, algorithms, etc.) that regulate and control the offering and requesting of resources distributed throughout the network. For example, a pricing system is provided when there are multiple nodes, for example one or more nodes offering to provide communication resources (e.g., general connectivity resources, Internet connectivity resources, memory and/or processing resources, etc.) and another one or more nodes requiring some type of communication connectivity (e.g., general network connectivity, Internet connectivity, real-time communication connectivity, delay tolerant data delivery connectivity, etc.), memory resource utilization, processing resource utilization, etc.

Various example systems and methods are presented herein in a modular fashion (e.g., including various models, methods, algorithms etc.). For example, the discussion herein describes example models for the managing the resources available and the resource requirements, example methods to exchange messages with information about resource offers and requests (e.g., resource subscriptions, etc.), example algorithms that may be implemented to form (e.g., select, adapt, etc.) a pricing model and/or determine a resource allocation to pursue (e.g., to be pursued by the resource subscriber, to be pursued (or encouraged) by the resource provider, etc.). For example, providing a dynamic and individual pricing model for one or more resources may, for example, achieve load balancing with regard to resource utilization. For example, a first node may need (or prefer) a real-time connection for the immediate communication of particular information, while a second node may accept delay tolerant communication of particular information (e.g., within a maximum time limit, etc.) and thus the utilization of the resources may be performed over an acceptable period of time (e.g., a default and/or specified time) without imposing strict demands on the network. Note that the first node may also, for example, concurrently (e.g., during a same short time-frame) or simultaneously (e.g., at the same time) be performing real-time and delay-tolerant communications (e.g., through a same communication network pathway, through different respective communication network pathways, etc.).

Figure 8:
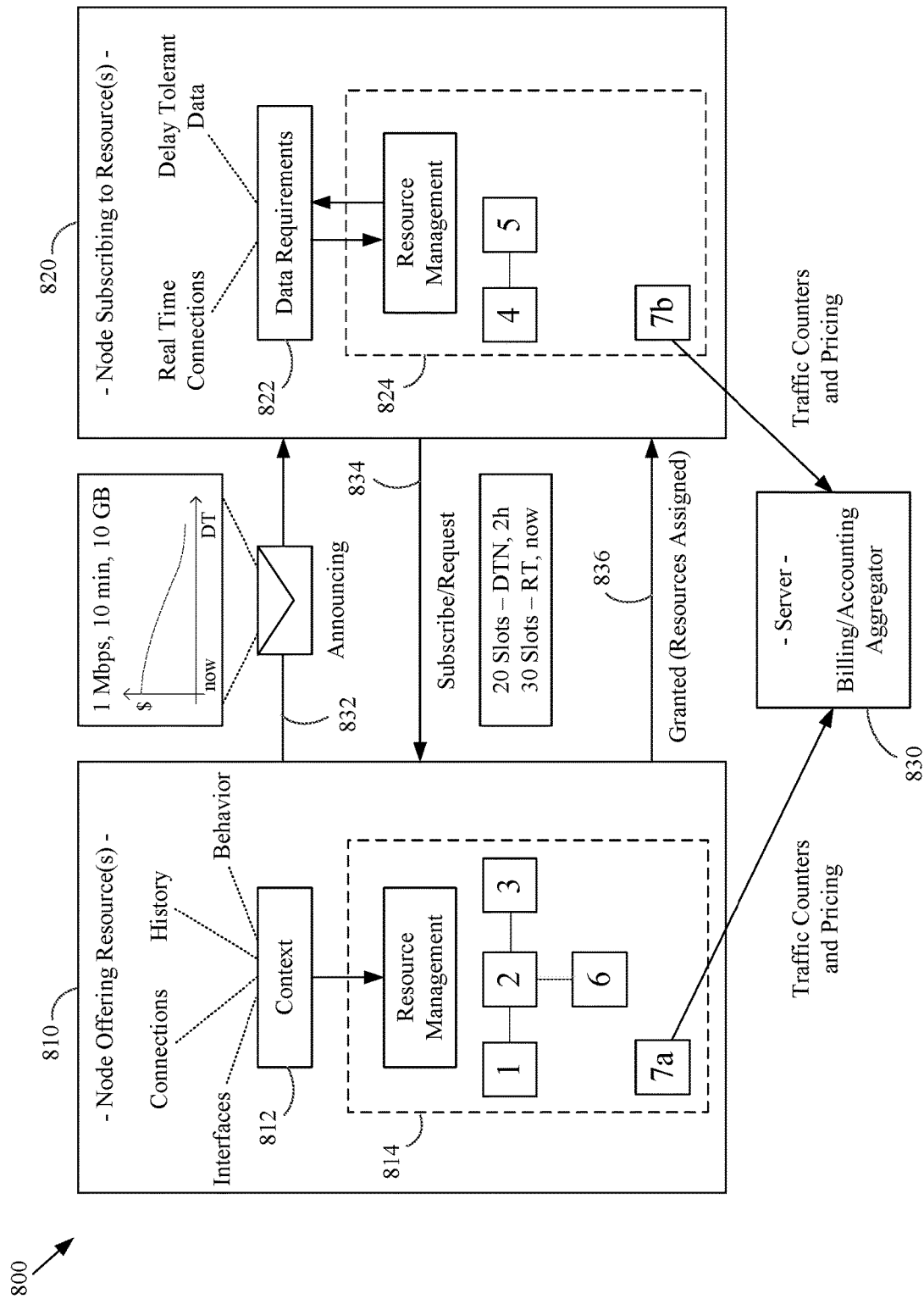
FIG. 8 shows a block diagram of an example communication network, in accordance with various aspects of the present invention.
Figure 9:
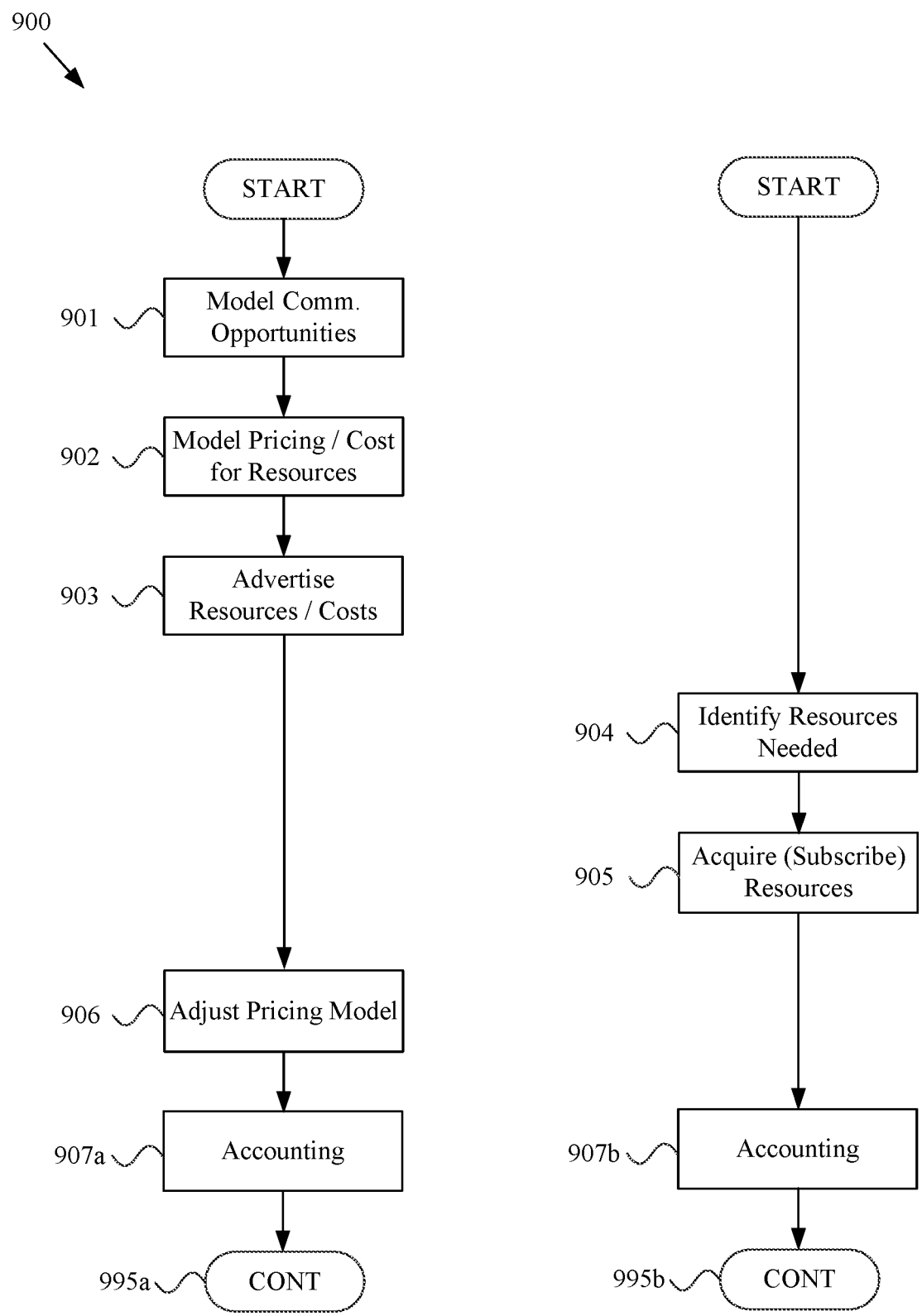
FIG. 9 shows a flow diagram of an example method of managing communication network infrastructure access, in accordance with various aspects of the present disclosure.
Figure 10:
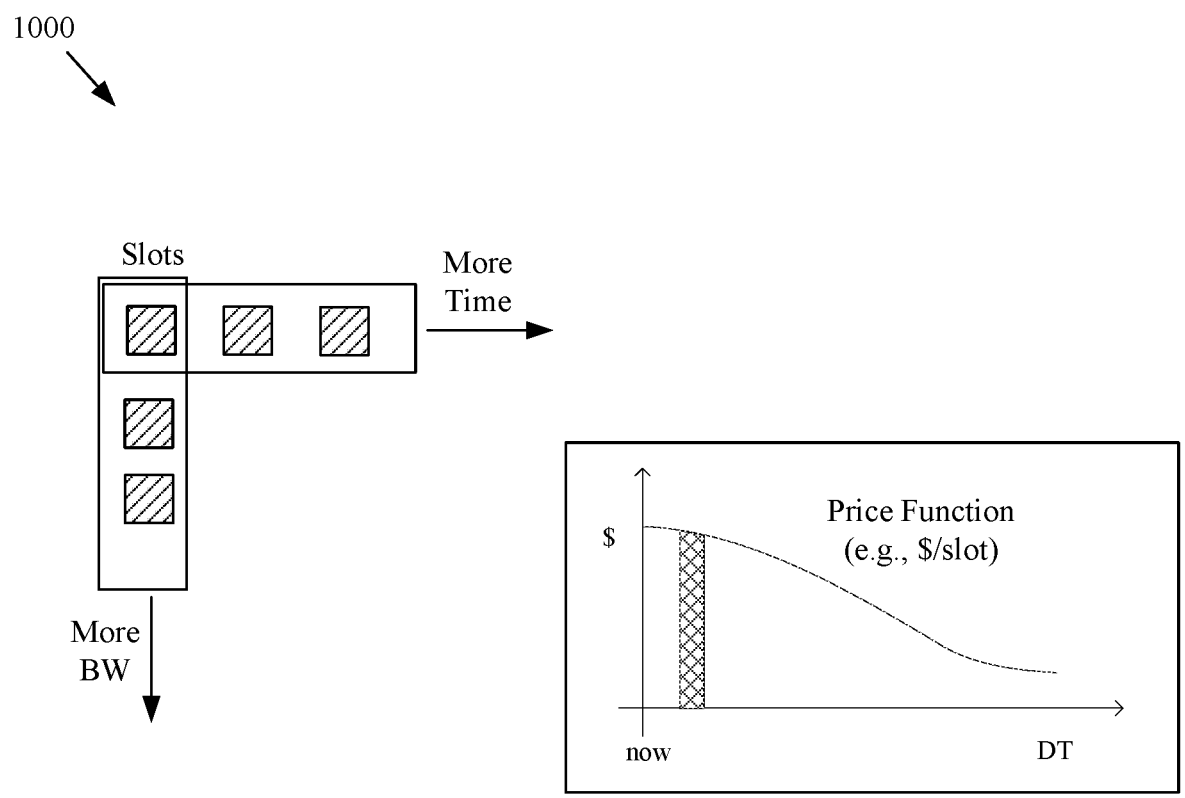
FIG. 10 shows a diagram of an example pricing function, in accordance with various aspects of the present disclosure.

Various aspects of this disclosure will now be presented with regard to FIGS. 8-10, which will generally be discussed together. FIG. 8 shows a block diagram of an example communication network 800, in accordance with various aspects of the present invention. FIG. 9 shows a flow diagram of an example method 900 of managing communication network infrastructure access, in accordance with various aspects of the present disclosure. FIG. 10 shows a diagram of an example pricing function 1000, in accordance with various aspects of the present disclosure. The example systems and methods of FIGS. 8-10 may, for example, share any or all characteristics with each other. Also, the example systems and methods of FIGS. 8-10 may share any or all characteristics with the other example methods, method steps, systems, networks, and/or network components 100, 200, 300, 400, 500-570, 600, 700, and 1100, discussed herein.

In the example system 800, the Context Block 812 (or module) of the Offering Node 810 (e.g., the node offering the resources) evaluates context information (e.g., information about interfaces, connections, history, network and/or node past and present behavior, etc.), and provides an input to the Resource Management Block 814 (or module). The Resource Management Block 814 may then, for example, determine and announce the resources available and respective price for each of the available resources.

As shown illustratively in FIG. 8, the Resource Management Block 814 (or module) of the Offering Node 810 includes aspects (or blocks or modules) 1, 2, 3, and 6 (as discussed herein), which are associated with characterizing the resources available, the price/reward model and algorithm, the methods to announce resources and/or prices, etc. The Data Requirements Block 822 (or module) of the Subscribing Node 820 (e.g., the node wanting to utilize and ultimately utilizing the resources) may, for example, evaluate communication requirements (e.g., its data communication requirements) for example regarding real-time communications and delay tolerant communications, and provide information to the Resource Management Block 824 (or module) of the Subscribing Node 820. The Resource Management Block 824 (or module), for example based at least in part on the resource offer information received (e.g., received from an Announcing Message 832 of the Offering Node 810, etc.) and on information of the data communication requirements received (e.g., from the Data Requirements Block 822 of the Subscribing Node 820, etc.), determines the resources to request (or subscribe), which are shown graphically in FIG. 8 as aspects (or blocks or modules) 4 and 5. Both the Offering Node 810 and the Subscribing Node 820 may, for example, have a System aspect (or block or module), which is shown graphically in FIG. 8 as aspect 7 (e.g., 7a and 7b), to perform the resource utilization (or traffic) accounting, which along with the respective price, is sent periodically to the Server 830, which may then aggregate the accounting (or billing) over time.

Note that although the discussion of FIG. 8 is presented with regard to a first node (e.g., the Offering Node 810) offering resources and with regard to a second node (e.g., the Subscribing Node 820) subscribing to offered resources), it should be noted that at any point in time, a single node (e.g., a Mobile AP, a Fixed AP, a Mobile AP of an autonomous vehicle, a client or user device, a Network Controller, etc.) may operate as both an offering node and a subscribing node. For example, a Mobile AP may operate as an offering node for another Mobile AP or for a client device, while concurrently or simultaneously operating as a subscribing node that subscribes to resources offered by a Fixed AP or another Mobile AP. For example, in an example scenario, the Offering Node 810 may subscribe to upstream resources for the purpose of offering (or providing) communication resources to the Subscribing Node 820. For example, in an example scenario, the Subscribing Node 820 may request a communication channel (or bandwidth) that cannot be offered to the Subscribing Node 820 until the Offering Node 810 acquires a channel (or bandwidth) from a FAP to which the Offering Node 810 is communicatively coupled.

The communication between the nodes (e.g., between the Offering Node 810 and the Subscribing Node 820) may, for example, be performed utilizing with a three-step handshake process, but the scope of this disclosure is not limited thereto. For example, as explained herein, such communication may be performed utilizing a two-step process, or a process including any other number of steps. In an example implementation, the Offering Node 810 may periodically send Announcing Messages 832 containing information describing the characteristics of the available resources and the price per resource (e.g., price per timeslot, price per channel, price per code, price per timeslot for immediate communication, price per timeslot for a timeslot with at most a first latency or delay, price per timeslot for a timeslot with at most a second latency or delay, price per memory block of a particular size, price for a particular number of processing cycles or for a particular processing job, etc.).

The Subscribing Node 820 may then receive the Announcing Message 832 and analyze the information to identify (or determine) the resources that it wants to utilize for its communication(s), and communicate a Subscribe (or request) Message 834 to the Offering Node 810.

To complete the agreement (or subscription) agreement, the Offering Node 810 may then send a Granted Message 836 (or OK message) (e.g., indicating that the subscription has been granted, identifying the resources assigned, etc.), at which point, the Subscribing Node 820 may utilize the granted (or subscribed to) resources. The Offering Node 810 may then, for example, designated the granted resources as being unavailable to other nodes (e.g., always, unless a particular set of events occur, etc.).

The following discussion will provide more specific example characteristics of the models, methods, and algorithms introduced above.

Regarding the first example aspect, shown graphically as block 1 in FIG. 8 and as block 901 in FIG. 9, the communication opportunities (e.g., available resources including slots, codes, memory, channels, processing capability, etc.) may be modeled (or determined).

A communication network (e.g., the Internet of Things (IoT), Network of Moving Things (NMT), vehicle transportation networks, the Internet, etc.) will comprise nodes. Such nodes may have one or more interfaces and paths to communicate with or through the communication network (e.g., to the Internet, IoT, etc.). The diversity and heterogeneity of paths may provide different requirements/characteristics that may (or should) be taken into account when identifying the resources of each offering node that are available to other nodes. In an example implementation, an offering node may announce all of the options available for neighboring nodes to utilize the node's connections (or communication resources or other resources), as well the characteristics of each connection (or other resources), for example regarding performance, availability, predictability, reliability, latency, error rate, guaranteed or predicted existence duration, etc. The node may, for example, assess the characteristics separately for each available connection. In such manner, the offering node can determine what the offering node is able to offer to subscribing nodes, and the subscribing nodes that want to utilize the offering node's offered connection(s) (or communication resources or other resources) can determine (or assess) whether any of the available connections fit the requirements of the data to be transported. The performance of each connection (or other resource) may, for example, be periodically measured (or analyzed or assessed) to have an accurate and current indicator of performance, in particular in substantially mobile environments where connection conditions or even the connections themselves can change dramatically over time.

Aspect 1 (or block 901) may perform such modeling (or determination of communication opportunities or available communication resources (or other resources)) in any of a variety of manners. For example, the Offering Node 810 may maintain a table of resources that have already been allocated and that are presently available. Aspect 1 (or block 901) may also, for example, probe the effectiveness of various communication pathways to gain an understanding of the actual communication bandwidth available and/or the latency associated with the user of the communication pathway. Such probing may, for example, be performed periodically, upon a detected significant change in node context, upon a received subscription request for a communication resource, etc. Aspect 1 (or block 901) may identify available assets in any of a variety of manners. For example Aspect 1 may identify available assets of a Fixed AP or Mobile AP based, at least in part, on mobility context (e.g., based on node location, node trajectory, predetermined vehicle route, vehicle trajectory information from an autonomous vehicle control system, anticipated time in-range, known communication dead zones, etc.).

For example, in an example scenario in which node location, trajectory, predetermined vehicle route, anticipated time in-range, etc., indicates that a communication resource presently available to allocate (e.g., a communication channel, etc.) is about to become unavailable, Aspect 1 may refrain from identifying such communication resource as being presently available and/or may identify that such communication resource will only be available for a particular amount of time. In another example scenario in which the node is currently in or anticipated to imminently be in a known communication dead zone, the node may similarly refrain from identifying a particular communication resource as being presently available and/or may identify that such communication resource will only be available for a particular amount of time. Conversely, anticipated availability of communication resources (e.g., based on node location) may be utilized to advertise the anticipated availability of communication resources. For example, in a scenario in which it is known (e.g., based on vehicle position, trajectory, planned travel route, historical patterns, etc.) that the node is about to enter an area in which particular communication resources are reliably available for utilization by other nodes, Aspect 1 may advertise such resources to be available and/or advertise such resources to be available at a particular time or during a particular time window.

Regarding the second example aspect, shown graphically as block 2 in FIG. 8 and as block 902 in FIG. 9, the pricing (or cost) of the available communication opportunities (e.g., available resources including slots, codes, memory, channels, etc.) may be modeled.

For example, the pricing model may depend on any of a variety of factors, non-limiting examples of which are provided herein. For example, the pricing model may depend on the opportunities of communication of the Offering Node 810, their characteristics and behavior, the requirements of the Subscribing Node 820, the data that the Subscribing Node 820 wants to deliver to the destination, etc. The data communication (or transport) requirements may, for example, include various characteristics, for example throughput/bandwidth available and/or required, the connection time available and/or required, the time in which data can be delivered, the time required to deliver the data (e.g., whether the Subscribing Node 820 can wait several hours for the data communication, whether the Subscribing Node 820 can want several minutes for the data communication, whether the Subscribing Node 820 needs immediate communication, whether and/or how much data loss is acceptable, etc.).

An example pricing model may, for example, comprise a set of multi-input functions, for example according to the number of connections, that take into account the price/cost per data block (e.g., a 1 KB slot, etc.) per slot (e.g., a 1 second slot, etc.) and the time by which the data block needs to arrive at its destination (e.g., needs to arrive within 5 hours, needs to arrive within 5 minutes, needs to arrive immediately or as soon as possible, needs to arrive by the end of the day, etc.). As an example, the resources for a subscribing node that requires a dedicated connection at 1 Mbps for the next 5 minutes may have a different cost than the resources for another subscribing node requiring 10 MB to be communicated to the destination by the end of the day. Note, however, that depending on overall resource availability, such desired connections may also be provided at a same or similar cost (e.g., during periods of low network utilization, etc.).

The pricing model may, for example, be dynamic and adaptable. For example, the pricing model may be updated by the node offering the connections (or communication resources) periodically, rather than reactively establishing a pricing each time the Offering Node 810 and the Subscribing Node 820 need to share resources.

For example, the pricing model may be based, at least in part, on supply and demand, where the supplier (e.g., the Offering Node 810 in this case) provides the cost of each of the connections, based on any one or more of a variety of factors (e.g., throughput or data rate, time (absolute or relative time), urgency (or acceptable latency), anticipated connection duration, probability of connection failure, etc. The consumer (e.g., the Subscribing Node 820 in this case) may then select, the offer that best fits the consumer's interests, knowing how much credit/money the consumer will spend for each offered option. The supplier may, for example, dynamically continually (or periodically) update the pricing model for new services during the day based on the changing connection (or network) conditions, based on predicted (e.g., based on history) changes to connection (or network) conditions, based on any of the node or vehicle context aspects discussed herein (e.g., based on location, trajectory, travel route, etc., of the supplier), etc. In an example implementation, the connections (or resources or slots) that have already been allocated (or subscribed to) may remain at the price at which the allocation was established. In another example implementation, the price may be adjusted (e.g., lowered) to continue to optimize network operation even after resources have been allocated.

In an example scenario, at a first time the Subscribing Node 820 may be able to transport 5 MB of data in 2 hours at a price of 10 credits, and at a second later time transport 5 MB in 2 hours at a price of 20 credits. Note that the Subscribing Node 820 may, for example upon predicting utilization and recognizing a relatively good price at the first time, order the transport of 10 MB in 2 hours for a price of 20 credits. The model (or the accounting aspect discussed herein) may then account for non-utilized, but subscribed, resources in any of a variety of manners.

Various aspects of this disclosure logically separate the pricing function with the accounting function. This segregation has been adopted for illustrative clarity and because at least some separation may be beneficial. It should be noted, however, that the scope of this disclosure should not be limited by such logical separation. For example, since various networks discussed herein may comprise substantial mobile components, the nodes providing and/or utilizing the communication resources may move out of range of each other, be subjected to moving or unexpected obstructions, etc. In such a dynamic communication environment, an example implementation may account (e.g., bill, etc.) only for resources that have been actually used. The non-utilized resources may, for example, be un-billed, billed at a lower rate, billed only to the extent that they were not re-allocated to another node, etc. There may also be a minimum contract cost, for example to discourage opportunistic over-subscription on the part of subscribing nodes that are unlikely to utilize all of the subscribed resources. Also for example, non-utilized resources may be billed until re-allocated and/or re-offered.

The pricing model may also, for example, consider stability, reliability, and predictability of the connection when associating a price with the connection and/or include such stability, reliability, and/or predictability information (along with the price or cost) in the offer information. For example, the Offering Node 810 (e.g., the Resource Management Block 814 thereof) may offer a discounted price for a currently (or historically) less reliable connection, or conversely may associate a premium price with a currently (or historically) highly reliable connection. The Subscribing Node 820 (e.g., a Resource Management Block 824 thereof) may then consider its own reliability needs with selecting a connection, for example selecting a lowest cost connection that is predicted to meet its reliability needs.

In an example scenario, the Offering Node 810 may offer a relative low price for an offered connection, because the connection has a relatively higher risk of connection loss (e.g., based on node location (e.g., of the offering node, subscribing node, and/or other node, etc.), based on node movement or velocity (e.g., of the offering node, subscribing node, and/or other node, etc.), based on predicted node trajectory (e.g., of the offering node, subscribing node, and/or other node, etc.), based on predetermined vehicle route (e.g., of the offering node, subscribing node, and/or other node, etc.), based on autonomous vehicle control information (e.g., routing information, location information, trajectory information, etc.), based on historical dead zone location, etc.). For example, the Offering Node 810 (e.g., a Mobile AP) may offer a relatively low cost for a multi-hop connection to a Fixed AP when the Mobile AP predicts that its trajectory may result in a lossy or likely dropped connection. Also for example, when a planned trajectory for an Offering Node 810 (e.g., a Mobile AP) stays within a geographical area associated with a high-reliability connection directly to a particular Fixed AP, the Offering Node 810 may offer a relatively high cost for the utilization of such a high-reliability connection (e.g., for real-time communication).

In an example implementation, the Offering Node 810 (e.g., a Resource Management Block 814 thereof) may also consider its memory capacity, for example for the delivery of delay tolerant data. For example, if the Offering Node 810 determines that its local memory resources, which might generally be utilized to store delay tolerant data for later delivery, are running low, the Offering Node 810 may increase its offered costs for delay tolerant communication. Thus, there may accordingly be scenarios in which a delay tolerant communication is priced as much as a real-time communication, for example since the Offering Node 810 might have to actually communicate the delay tolerant date (or other data stored in the Offering Node's 810 memory) immediately (or relatively quickly) to avoid a memory overflow.

Regarding the third example aspect, shown graphically as block 3 in FIG. 8 and as block 903 in FIG. 9, the Offering Node 810 announces (or communicates, publishes, advertises, transmits, etc.) the offered resources. The announcing is shown graphically in FIG. 8 at Announcing Message 832 (e.g., offering a particular link speed, duration, latency, quality, and/or total amount of data at a particular price that varies according to latency requirements and/or other quality metrics, as discussed herein). The Announcing Message 832 may also, for example, include context information regarding the Offering Node. The Offering Node 810 may, for example, perform such announcing in any of a variety of manners, non-limiting examples of which are provided herein.

For example, the Offering Node 810 may utilize a local broadcast/multicast approach, in which the offered resources are only offered to neighbor nodes, only offered to neighbor nodes capable of utilizing the resources, etc. In such manner, the scope of the resource offer announcements may be limited to avoid flooding the network with unnecessary information. The Offering Node 810 may, for example, communicate the Announcing Messages 832 periodically (e.g., asynchronously), in response to a request received from the Subscribing Node 820 (e.g., synchronously), whenever a resource becomes available or unavailable, any combination thereof, etc. For example, though a Subscribing Node 820 may typically wait until resource offers 832 are periodically transmitted by the Offering Node 810, in an emergency situation, the Subscribing Node 820 may request a resource offer (e.g., making a direct request to the Offering Node 810, broadcasting a request to all nodes within communication range, multi-casting a request to all nodes in a multi-cast group, etc.) and/or may immediately request desired resources (e.g., including a requested cost, a maximum cost, etc.).

The Announcing Message 832 may, for example, include information of the available resources regarding available connections, current and/or anticipated connection behavior or quality, information describing a respective pricing model associated with each connection (or a plurality thereof), etc.

The context information about the Offering Node 810 and/or the environment (including other nodes, etc.), for example as discussed herein with regard to the Context Block 812, may help to optimize the announcing (or publishing, etc.) of the resources being offered. For example, if the Offering Node 810 has resources to offer, but almost all of such resources include (or are associated with) overloaded/congested sections of the entire communication path, the Offering Node 810 may increase the time between the Announcing Messages 832 or even stop transmitting the Announcing Messages 832 for a time. Also for example, if the Offering Node 810 has resources to offer, but the Offering Node 810 is receiving several announcing messages (or advertisements, etc.) from neighbor nodes with more available resources and/or lower prices, the Offering Node 810 can stop transmitting the Announcing Messages 832 for a time (e.g., continuing to monitor the announcing messages from the other nodes until it is determined that the Offering Node 810 is offering resources at costs similar to those of the other nodes). Similarly, the Offering Node 810 may narrow the set of destination nodes to which Announcing Messages 832 are sent (e.g., only sending the Announcing Messages 832 to high-priority nodes, only sending the Announcing Messages 832 to nodes of a same fleet as the Offering Node 810, only sending the Announcing Messages 832 to public safety vehicles, etc.). Additionally for example, if the Offering Node 810 is a Mobile AP on a vehicle operating at a relatively low vehicle speed, the Offering Node 810 may determine to associate its offered connections with a relatively stable rating and/or a relatively long predicted duration compared to when the vehicle is operating at a relatively higher speed. Note that the Announcing Messages 832 may include any or all of the context information discussed herein concerning the Offering Node 810 and/or of other nodes that may be along a communication pathway.

The Offering Node 810 may also, for example, utilize historical knowledge to determine pricing and/or resource offer announcing strategy. For example, history from one or more previous days, together with location and time information, may be utilized to predict crowded zones, congested communication paths, resources available, resources required, etc. For example, connections historically associated with unreliability at particular locations and/or times may be priced lower, or Announcing Messages 832 concerning such resources may be skipped or deferred if the historical reliability is below a threshold. Thus, such historical knowledge may be used not only for pricing, but may also be used for determining the manner in which Announcing messages 832 may be communicated.

Regarding the fourth and fifth example aspects, shown graphically as blocks (or modules) 4 and 5 in FIG. 8 and as blocks 904 and 905 in FIG. 9, the Subscribing Node 820 (or Resource Management Block 824 thereof) receives the Announcing Message 832, identifies the resources to request for utilization, and communicates a Subscription Request Message 834 (or Request Message 834) back to the Offering Node 810 to subscribe to the identified resources.

The Subscribing Node 820 node may, for example, periodically receive Announcing Messages 832 from neighboring nodes (e.g., the Offering Node 810, etc.), advertising (or announcing) the resources (e.g., connections, etc.) being offered by the neighboring nodes and the price that the Subscribing Node 820 will have to pay to use the resources. Note that as discussed herein, the Announcing Messages 832 may include any of a variety of other types of information. The Subscribing Node 810 may analyze any or all of such information when determining whether to subscribe to a particular resource. For example, the Resource Management Block 824 may analyze a price (or cost) to determine whether it is low enough to meet the cost objectives of the Subscribing Node 820 (e.g., by comparing the cost to a threshold); may analyze a channel bandwidth to determine whether it meets the communication objectives of the Subscribing Node 820; may analyze link latency and/or quality information to determine whether they meet the communication objectives of the Subscribing Node; may analyze vehicle context information associated with the Offering Node 810 (e.g., if the Offering Node 810 is a Mobile AP) to determine whether the Offering Node 810 is able to meet communication constraints of the Subscribing Node 820 with regard to time-in-range, etc.

Thus, when the Subscribing Node 820 decides that it will pay the price to utilize the offered resource, the Subscribing Node 820 sends a Subscription Request Message 834 (or Request Message 834) to the Offering Node 810. In an example scenario, the Request Message 834 may include information identifying the slots or channels that the Subscribing Node 820 wants to use. The Request Message 834 may also, for example, include information regarding time and bandwidth for real-time data communication, the amount data to transport and the maximum time allowed to deliver the date in the case of delay-tolerant data communication, etc. The Request Message 834 may also, for example, include context information about the Subscribing Node 820 (e.g., for consideration by the Offering Node 810 in making modifications to the resource offering).

In an example implementation, the Subscribing Node 820 may need to wait for a Granted Message 836 (or Resource Assignment Message or OK Message or other reply message) from the Offering Node 810 to confirm that the Offering Node 810 is committed to providing the resources requested by the Subscribing Node 820. Then the Subscribing Node 820 may begin utilizing the granted resources. Note that such a Granted Message 836 may comprise information identifying the granted resource, how the Subscribing Node 820 is to utilize and/or access the resources (e.g., channel identification, secure access information, timing requirements or durations, etc.). If the Offering Node 810 replies to the Request Message 834 with a negative reply, the Subscribing Node 820 may search for other opportunities from advertisements being broadcast and repeat the request and reply process. For example, a negative reply may include information about why the request was denied, information updating a list of available resources and pricing, etc.

In another example implementation, the Subscribing Node 820 may skip waiting for the Announcing Message 832, and transmit the Request Message 834 to request needed resources. Such a Request Message 834 may, for example, providing information describing the real time and/or delay tolerant data communication needs of the Subscribing Node 820. In this case, the Offering Node 810 (or a plurality thereof) may respond with a message to the Subscribing Node 820 that indicates pricing for the requested resources (or for resources that the Offering Node 810 believes will satisfy the communication needs of the Subscribing Node 820, wherein such resources may be different from the requested resources). For example, all potential Offering Nodes 810 that receive the Request Message 834 from the Subscribing Node 820 may respond with pricing information for resources that meet the communication needs of the Subscribing Node 820. The Subscribing Node 820 may then, for example, send another message to the Offering Node 810 that is providing the selected resources to indicate that the Subscribing Node 820 desires to utilize the selected resources.

As discussed herein, the three-step handshake (or message exchange) process is merely exemplary. A two-step handshake (or message exchange) process may also be utilized (e.g., instead of or in addition to the three-step handshake). For example, the Subscribing Node 820 may provide the maximum price that the Subscribing Node 820 is willing to pay for each resource and the Offering Node 810 may assume that a resource offer sent in reply with a lower price than the maximum price will be accepted by the Subscribing Node 820. In an example implementation, such types of requests might be generally utilized only in special circumstances (e.g., to minimize unnecessary message traffic). For example, such requests may be utilized in scenarios in which the Subscribing Node 820 needs resources quickly or when the communication requirements are so demanding that there is a low probability of the neighboring nodes being able to fulfill the requirements.

The Offering Node 810 (e.g., a Resource Management Block 814 thereof) may, for example, maintain a list indicating the resources that are already assigned to (or allocated to) other nodes. Such a list may help the Offering Node 810 to manage its resources for current and new resource offers. The Subscribing Node 820 (e.g., a Resource Management Block 824 thereof) may also maintain a list of such resource information, for example to assist the Subscribing Node 820 with fulfilling the communication requirements of the applications communicating the real-time and delay-tolerant data. After acquiring the resources, the Subscribing Node 820 can interact with other system components (e.g., internal modules, etc.) to adjust/configure the resources and, for example, to trigger a process/application to start using the newly acquired resources.

The Subscribing Node 820 (e.g., a Resource Management Block 824 thereof) may analyze its communication needs (e.g., real time and/or delay tolerant data communication needs) and the resource offer received in the Announcing Message 832 to select the resource offer that best matches its needs and/or which satisfies minimum resource needs at an acceptable or lowest cost, etc. The Subscribing Node 820 may determine the best match in any of a variety of manners, non-limiting examples of which are provided herein.

For real time communication needs, the decision may, for example, be based on the set of currently available resources identified by the neighbors (e.g., identified by the Offering Node 810 and others like it). The selection of resource is thus a real time (or nearly real time) decision, since the need for the resources is imminent. For example, from the most recent Announcing Messages 832 received from neighbor Offering Nodes 810, the Subscribing Node 820 may select the lowest-cost resources that provide at least the minimum performance required. In a scenario in which an offered resource of a particular Offering Node 810 has the lowest price but does not meet the minimum requirements (e.g., throughput requirements, etc.), in various implementations, the Subscribing Node 820 may request resources from more than one Offering Node 810 to meet the total communication requirements, for example if the sum of the prices of the resources from a plurality of Offering Nodes 810 is lower than utilizing only resources from a single Offering Node 810. Note that whether the communication can be effectively split between respective resources of different Offering Nodes 810 depends on the nature of the communication. For example, such splitting may be more appropriate for general web traffic than for real time voice communications.

For delay tolerant communication needs, resource selection may be different from resource selection for real time communication needs, since for example the data transport does not need to be performed immediately. For example, in various delay tolerant data communication scenarios, the communication can be performed minutes later, hours later, days later, etc. In such scenarios, the Subscribing Node 820 can wait for a neighbor Offering Node 810 that offers favorable pricing to transport the data to the destination, and then subscribe to that offer. The Subscribing Node 820 may also, for example, split the data into portions, and send a portion of the delay-tolerant data to a neighbor Offering Node 810 with a favorable offer (e.g., depending on the resources of that neighbor, such as limited storage, etc.), and then later send one or more remaining portions of the data through the same or another neighbor Offering Node 810.

For optimal decision making, the Subscribing Node 820 should be aware of and consider the importance/priority and urgency of the delay tolerant data, for example to be able to wait for the best deals without compromising the communication requirements of the data. For example, with a relatively distant communication deadline, the Subscribing Node 820 may have time to wait for favorable terms. As the deadline then draws near, the Subscribing Node 820 may raise its price (or cost) threshold, for example due to the increased urgency associated with the approaching deadline.

Over time and experience subscribing to delay tolerant resources from particular neighbor Offering Nodes 810 (or in particular regions, in particular timeframes, etc.), the Subscribing Node 820 can estimate expected prices and improve its resource selection accordingly. For example, in a scenario in which a particular Offering Node 810 is historically known to offer favorable terms at a particular time of day (or location, etc.), if the communication deadline permits, the Subscribing Node 820 can wait for the particular time of day (or location, etc.) to receive the favorable terms. Similarly, if the Subscribing Node 820 observes over time that waiting more than a threshold amount of time typically results in the Subscribing Node 820 having to subscribe to relatively expensive resources, the Subscribing Node 820 may be more receptive to accepting moderately priced resources as the threshold amount of time approaches. Also note that the Subscribing Node 820 can black list (or add a cost factor for) a particular Offering Node 810 associated with offered communication resources that have historically failed to meet expectations.

Regarding the sixth example aspect, shown graphically as block 6 in FIG. 8 and as block 906 in FIG. 9, the Offering Node 810 may implement an algorithm to adapt the pricing model in response to any of a variety of causes or conditions and/or to meet any of a variety of goals (e.g., to reward or penalize a subscribing node, to alleviate network congestion, to account for a substantial change in the availability of various resources, etc.).

The Offering Node 810 may, for example, implement the algorithm to perform a systematic strategy to adjust the pricing model. The pricing model is generally described here based on money and cost, but the scope of this disclosure is not limited thereto. For example, the pricing model may be implemented based on credits, rewards, rebates, coupons, services, status, points, contractual obligations, etc.

As shown herein, the pricing model may consider any of a variety of parameters. The pricing model may also, for example, consider metrics related to status (or condition) of the wireless medium access. For example, a high congestion situation may, for example, result in an increased price per slot, for example managing the congestion by decreasing the probability of a neighboring Subscribing Node 820 utilizing the offered resource(s) unless the Subscribing Node 820 has a relatively high need for the offered resource(s). In addition to adjusting resource price, in a high congestion situation, the Offering Node 810 may also refrain from (e.g., not include in an Announcing Message 832) announcing the availability of any resource that includes the congested/overloaded path, for example to avoid compromising the performance of the resources already provided to and being utilized by the other neighbor nodes.

The pricing function may, for example, be adjusted periodically (e.g., every number of seconds, every number of minutes, every number of hours, etc.), for example based on changes to the Offering Node 810, based on changes to the context in which the Offering Node 810 is operating, etc. Note, however, that once an agreement is reached for resource price, in various implementations, the agree-upon price will not change. For example, slots already subscribed before the price modifications may remain associated with the previously-defined price. The rate (or period) at which the pricing model is adjusted may be static or may vary (e.g., depending on amount of network utilization, depending on time of day, day of week, etc.). The period defined for the adjustment of the pricing model should, for example, not be too long to take into account the changes in the offering node and/or its general operating context, but also should not be too short such that the Offering Node 810 is continually announcing new prices and having to manage a relatively large number of resource subscriptions with different nodes and different respective prices.

In an example implementation, the overall pricing model may be defined considering the real-time communications and the delay tolerant data transport (PRICE=Now 11 Later). FIG. 10 presents a graphical example.

The Subscribing Node 820 generally (but not always, as discussed herein) determines the resources that are needed to satisfy its communication goals, and calculates how much the Subscribing Node 820 will need to spend to subscribe to such resources. This determination may, for example, be based on the total slots required (time+bandwidth) and the current pricing model (e.g., as received in an Announcing Message 632). For example, if the Subscribing Node 820 wants to conduct a real-time communication immediately, the Subscribing Node 820 will generally have to pay the maximum price per slot, and then multiply such price by the time slots needed to achieve the desired bandwidth for the real-time communication. For example, as shown in FIG. 10, slots may be accumulated (within a particular timeframe) to result in an overall aggregate communication bandwidth. If, however, the data to be delivered can reach the destination in a delay-tolerant (DT) manner (e.g., within a number of minutes, within a number of hours, within a day, etc.), the Subscribing Node 820 can subscribe to the resources necessary to implement the data transport for a substantially lower price than the price for real-time communication resources.

The price for the resources may, for example, depend on the conditions of the Offering Node 810 combined with the urgency of the Subscribing Node 820 to utilize the resources. For example, for the communication of a relatively large amount of data, it will generally be cheaper to use delay-tolerant data communication and/or splitting the data through different nodes offering different respective pricing. The Offering Node 810 may, for example, generally communicate a limit with announcing available resources, since there is generally a limit of throughput for real-time communications and a limit of storage and communications for delay tolerant transport.

For the pricing function for real-time communications, the Offering Node 810 may consider any of a variety of factors, including for example: expected connection time, throughput/bandwidth, link cost, and link utilization. For the pricing function for delay-tolerant communication, the Offering Node 810 may consider any of a variety of factors, including for exampled: data storage capacity, urgency, importance/priority, and probability of future communication opportunities. Note also that any or all of the factors discussed herein may be considered for the pricing function for real-time communication and delay-tolerant communication. For example the list of factors considered for real time communication resources may, in some implementations, be the same as the list of factors considered for delay tolerant communication resources.

Regarding the seventh example aspect, shown graphically as blocks 7a and 7b in FIG. 8 and as blocks 907a and 907b in FIG. 9, the Offering Node 810, the Subscribing Node 820, and/or a Billing/Account Aggregator Server 830 may implement various accounting functions. For example, the Offering Node 810 may monitor and measure the resources that each neighbor Subscribing Node 820 used from its allocated resources (or connections), for example in order to calculate the real cost that should be charged to the other nodes.

In an example implementation, the resources subscribed to by the Subscribing Node 820 and based on the price defined are just an estimation of what the Subscribing Node 820 is intending to use (perhaps in addition to a safety margin), but in mobile communication environments (e.g., vehicle communication networks, etc.) it may not be possible to use the subscribed resources (or connection) for the defined time. Thus, in an example implementation, the defined price model is applied to the resources (e.g., slots, etc.) that are actually used by the Subscribing Node 820 to which such resources were allocated.

In an example implementation, a central entity (e.g., a Server or Billing/Accounting Aggregator 830) may receive information describing the utilization of all resources for each node and the cost of each resource utilization. The central entity may then, for example, provide the daily/weekly/monthly cost that a node spends utilizing the resources of other nodes. Note that, as discussed herein, any node can be both an offering node and a subscribing node during a time period. The Subscribing Node 820 may, for example, calculate the cost that it spent for each communication based on the agreed-upon price and the slots (or other resources) actually used (e.g., a usage cost), and thus have an estimation of the final price it will be charged at the end of the day/week/month (or other billing cycle). Both values of the respective cost calculated by the Offering Node 810 and the Subscribing Node 820 should be similar, otherwise they may agree on (or converge to) a solution and notify the Server 830. The Server 830 thus has information on the cost to be assigned to all nodes. The example Server 830 has an overall vision of the resources used by the nodes, so it can play an important role in trying to resolve questions (or disagreements) regarding costs. The overall knowledge can also be used by the Server 830 to provide indications (or hints) to the nodes about the average pricing being charged under different conditions, and to help maintain a homogeneous and fair pricing model.

Various aspects of the present disclosure will now be presented by discussion of various example use scenarios. It should be understood that the use scenarios are merely examples, and that the scope of this disclosure should not be limited by characteristics of the example use scenarios.

In a first example scenario, a plurality of vehicles (e.g., Mobile APs thereof) are near a Fixed AP. For example, since the resources of the Fixed AP (e.g., an Offering Node 810) are limited, the price of offered resources may grow with the number of vehicles. In such a scenario, just the vehicle (e.g., Mobile AP thereof, for example a Subscribing Node 820) that really needs the resources should be willing to pay the relatively high price, while the others can wait for the next opportunity. Depending on the bottleneck of the Fixed AP connections, some vehicles (e.g., Mobile APs thereof) may subscribe to resources for delay tolerant data transport but not subscribe to real-time resources from the Fixed AP. In scenarios in which there is just one vehicle (e.g., a Mobile AP thereof) nearby a Fixed AP, it should have the advantage of the existence of an ample supply of resources at a relatively low price. In such case, the Mobile AP may exploit the opportunity to have real-time connections, even if not needed, and offload as much delay tolerant traffic as possible.

In a second example scenario, a plurality of users may be sharing the same vehicle (e.g., Mobile AP thereof), for example a bus or other mass transit vehicle. The users may thus have a substantially limited connection to the Internet. However, one or more of the user devices (or passengers) may have an LTE data plan with available communication resources, so the user device(s) can offer some of its resources (at a cost) to other passengers that are requiring a real-time connection. The price may, for example, be high depending on the user's LTE data plan but the available communication resources may be valuable for a user that needs to conduct a video call. There may be more than one user device (or passenger) offering LTE resources, so which resources are utilized may ultimately be determined by the price and resources provided by each user device. Note that the user's data provider may also direct the offering and/or providing of resources of the user's device (e.g., with or without the user's knowledge).

In a third example scenario, there may be sensors spread over a small area, and thus competing for communication resources provided by a single vehicle (e.g., by a Mobile AP thereof, etc.). The sensors that have information that still has a substantial amount time remaining to arrive at the destination within a time limit can wait for a next opportunity. The decision may also depend on context information, such as the storage of the sensor, the urgency of the information, the prediction of next resources based at least in part on historical data, etc.

In a fourth example scenario, several APs (e.g., Fixed APs, etc.) are connected to a same Network Controller (NC). Thus, the resources of the NC are shared among the APs. In cases where some of the APs require a lot of resources from the NC, the other APs can slow down, reducing the consumption of resources from the NC connection. Some of the APs may, for example, reduce the resources offered to the vehicles (or Mobile APs thereof) through the Announcing Messages, thus reducing the resources required from the infrastructure. The selection of the APs that will enter into such a low resource consumption mode depends on the context information, such as the importance of the APs for the on-going coverage and communications.

In a fifth example scenario, various vehicles are connected to the Internet or cloud infrastructure and various other vehicles are not. In such scenario, the vehicles (or Mobile APs thereof) with Internet or cloud access may offer resources associated with maintaining such a connection to other vehicles (or Mobile APs thereof) and/or users (or client devices). Some of the other vehicles may, for example, have urgent needs for real-time communication of data, while others have delay tolerant communication needs and can wait for offers with more or cheaper resources.

A system and/or method implemented in accordance with various aspects of the present disclosure offers many benefits. For example, various aspects of the present disclosure provide a complete system with a set of models, methods, algorithms, etc., to manage the access and utilization of the infrastructure/network. As utilization of the Internet of Things (or Network of Moving Things) increases, it is important to develop new models to regulate the utilization of the infrastructure. It is also beneficial to provide a model for accounting and billing of the systems, which can cope with mobile and dynamic environments expected in the Internet of Things (or Network of Moving Things).

Various aspects of this disclosure also provide for the dynamic pricing of offered communication resources, the methods to announce and negotiate the resources, and the algorithms to effect better decisions on the offered conditions, and better decisions on the accepted offers.

Various aspects of the present disclosure provide models for managing the utilization of the resources provided by a vehicle communication network to third parties. In accordance with various aspects of the present disclosure, the utilization of such resources is monetizable in a systematic and clear way. For example, various aspects of the present disclosure provide for monetizable utilization of communication resources in a dynamic vehicle communication network, in which every node (or most nodes) can share some of its own resources for a specific amount of time.

In accordance with various aspects of the present disclosure several third parties may utilize a vehicle communication network (e.g., utilizing sensors, vehicle fleets, autonomous vehicles, etc.), each requiring different respective types of communication resources of the vehicle communication network for different time periods and purposes. In addition to providing access to the needed communication resources, various aspects of this disclosure provide for managing the accounting and billing for these resources. For example, third party utilization of the communication resources of the vehicle communication network is billed at a correct amount, which for example depends on the resources utilized and/or on the conditions of the communication network. The pricing model may, for example, be dynamically adjusted and announced to neighboring nodes.

As explained herein, the functionality (e.g., node action determination and/or implementation functionality, etc.) discussed herein may be performed in a single node, for example any or all of the nodes discussed herein, but may also be performed in a distributed manner in which respective portions of the functionality discussed herein are performed by respective nodes. A non-limiting example of a network and/or node implementation is provided at FIG. 11.

Figure 11:
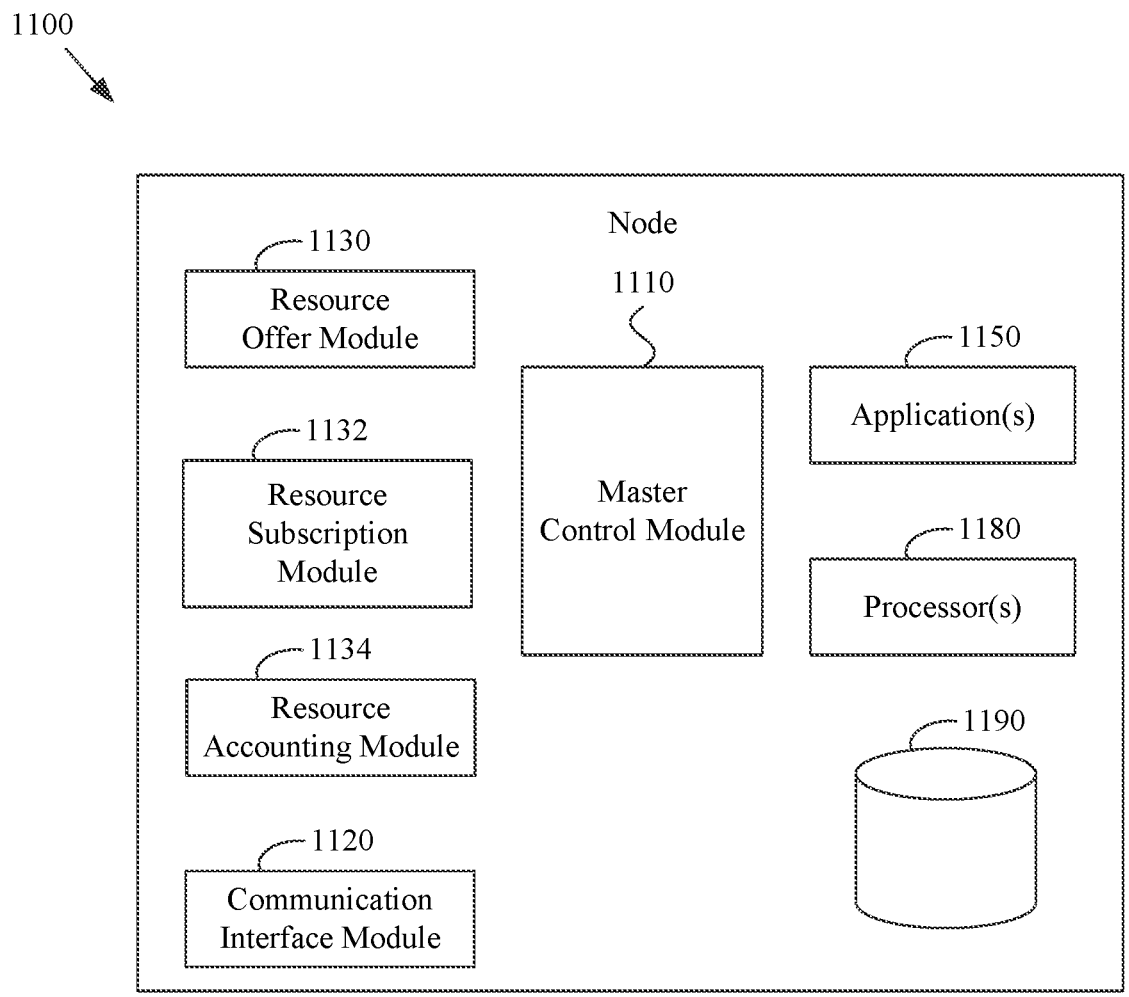
FIG. 11 shows a block diagram of an example network node, in accordance with various aspects of the present disclosure.

FIG. 11 shows a block diagram of various components of an example network node, in accordance with various aspects of the present disclosure. The example node 1100 may, for example, share any or all characteristics with the other example methods, method steps, networks, and/or network components 100, 200, 300, 400, 500-570, 600, 700, 800, 900, and 1000, discussed herein. For example, any or all of the components of the example node 1100 may perform any or all of the method steps presented herein. The example node 1100 may, for example, share any or all characteristics with the Offering Node 810, the Subscribing Node 820, and/or the Server 830.

The network node 1100 may, for example, comprise any of the network nodes discussed herein, for example an access point (AP) node (e.g., a Mobile AP, a Fixed AP, etc.), a Network Controller, a Cloud server and/or database, a vehicle control system, an autonomous vehicle control system, a client node, etc. The example node 1100 may comprise a variety of components (or modules), non-limiting examples of which are provided herein. Note that any or all of the components (or modules) may be housed in a single housing, but such configuration is not required. For example, in an example implementation, components (or modules) associated with providing access point services may be housed in a first housing, and components (or modules) associated with controlling vehicle movement may be housed in a second housing that is communicatively coupled to the first housing.

The example node 1100 may, for example, comprise a communication interface (I/F) module 1120 (e.g., including a cellular communication interface module, mobile or vehicle network communication interface module, Wi-Fi communication interface module, user/client communication interface module, etc.) that operates to perform any or all of the wireless and/or wired communication functionality for the node 1100, many examples of which are provided herein (e.g., communication with sensors external to (or of) the node 1100, communication with the onboard diagnostic (OBD) system of a vehicle in which the node 1100 is installed, communication with an autonomous vehicle control system of a vehicle in which the node 1100 is installed, communication with a vehicle dispatcher system, communication with peer nodes, communication with Mobile APs and/or Fixed APs, communication with Network Controllers, communication with client devices, backhaul communication, Cloud server communication, etc.). The communication interface (I/F) module 1120 may, for example, operate in accordance with any of a variety of cellular communication protocols, 3G, 4G, LTE, wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, etc.

The example node 1100 may, for example, comprise a resource offer module 1130 that operates to perform any or all of the resource offering functionality discussed herein (e.g., with regard to a Resource Offering Node 810 or a Resource Management Block 814 thereof, etc.). The example resource offer module 1130 may, for example, comprise hardware and/or software that operate to implement any or all of a node's resource offering functionality discussed herein. For example, the resource offer module 1130 may operate to perform any or all of the resource offering operations discussed herein in the discussion of FIGS. 8-10 and the other portions of the present disclosure.

The example node 1100 may, for example, comprise a resource subscription module 1132 that operates to perform any or all of the resource subscription functionality discussed herein (e.g., with regard to a Resource Subscribing Node 820, or a Resource Management Block 824 thereof, etc.). The example resource subscription module 1132 may, for example, comprise hardware and/or software that operate to implement any or all of the node's resource subscribing functionality discussed herein. For example, the resource subscription module 1132 may operate to perform any or all of the resource subscription operations discussed herein in the discussion of FIGS. 8-10 and the other portions of the present disclosure.

The example node 1100 may, for example, comprise a resource accounting module 1134 that operates to perform any or all of the resource accounting functionality discussed herein (e.g., with regard to a Resource Offering Node 810, a Resource Subscribing Node 820, a billing/accounting aggregator server 830, etc.). The example resource accounting module 1134 may, for example, comprise hardware and/or software that operate to implement any or all of the node's resource accounting functionality discussed herein. For example, the resource accounting module 1134 may operate to perform any or all of the resource accounting operations discussed herein in the discussion of FIGS. 8-10 and the other portions of the present disclosure.

The example node 1100 may, for example, comprise a Master Control Module 1110 that generally manages operation of the node 1100 at a high level. Such Master Control Module 1110 may, for example, comprise various aspects of an operating system for the node 1100.

The example node 1100 may further, for example, comprise one or more applications 1150 executing on the node 1100 (e.g., client management applications, security applications, power management applications, vehicle monitoring applications, location services applications, sensor interface applications, resource management applications for offering and/or subscribing to node resources, communication applications for which communication resources need to be subscribed, etc.).

The example node 1100 may also comprise one or more processors 1180 and memory devices 1190. The processor(s) 1180 may, for example, comprise any of a variety of processor characteristics. For example, the processor(s) 1180 may comprise one or more of a general purpose processor, RISC processor, microcontroller, ASIC, DSP, video processor, etc.). The memory device(s) 1190 may, for example comprise any of a variety of memory characteristics. For example, the memory device(s) 1190 may comprise a volatile memory, non-volatile memory, etc. The memory device(s) 1190 may, for example, comprise a non-transitory computer-readable (or machine-readable) medium that comprises software instructions that when executed by the processor(s) 1180, cause the node 1100 (or modules or entities thereof) to perform any or all of the functionality discussed herein (e.g., with regard to the example methods discussed herein, etc.). The memory device(s) 1190 may, for example, store node information (e.g., CNL information, Wi-Fi hotspot list information, NIB information, configurable cost function information, resource subscription and/or utilization information, etc.). The memory device(s) 1190 may also, for example, store any or all of the context information discussed herein (e.g., vehicle context information, intersection context information, network loading information, communication pathway congestion information, etc.). The memory device(s) 1190 may additionally, for example, store any or all of the information discussed herein regarding resource offering, resource subscribing, resource accounting, etc.

As explained herein, the functionality discussed herein may be performed in a single node, for example any or all of the nodes discussed herein, but may also be performed in a distributed manner in which respective portions of the functionality discussed herein are performed by respective nodes.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods that provide for cooperative, dynamic, and balanced access to the communication network infrastructure supporting the Network of Moving Things. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A vehicle communication network comprising:
a first node comprising:
at least one first communication circuit; and
at least one first module comprising a first processor and first memory, the at least one first module of the first node operable to, at least:
identify an offered resource that is available for utilization;
determine an offered cost associated with the offered resource; and
utilize the at least one first communication circuit to transmit a first message comprising information describing the offered resource and the offered cost; and
a Mobile Access Point (MAP) comprising:
at least one MAP communication circuit; and
at least one MAP module comprising a MAP processor and MAP memory, the at least one MAP module operable to, at least:
identify a needed resource that is needed by the MAP for performing a communication;
receive the first message transmitted by the first node;
determine, based on the needed resource, the offered resource, and the offered cost, whether to request the offered resource; and
if the at least one MAP module determined to request the offered resource, then at least:
utilize the at least one MAP communication circuit to transmit a second message to the first node requesting the offered resource; and
utilize the at least one MAP communication circuit to perform the communication;
wherein one or more of the identifying of the offered resource, the determining the offered cost, the identifying the needed resource, and the determining whether to request the offered resource are based on mobility information associated with one or both of the first node and the MAP.

2. The vehicle communication network of claim 1, wherein the first node comprises an access point of the vehicle communication network.

3. The vehicle communication network of claim 1, wherein the at least one first module of the first node is operable to determine whether to transmit the first message based on a location and/or trajectory of the MAP.

4. The vehicle communication network of claim 1, wherein the at least one first module of the first node is operable to determine the cost associated with the offered resource based on a vehicle and/or vehicle fleet with which the MAP is associated.

5. The vehicle communication network of claim 1, wherein the at least one first module of the first node is operable to:
receive the second message from the MAP; and
in response to the received second message:
grant the offered resource to the MAP;
monitor use of the offered resource by the MAP; and
determine a charged cost, different from the offered cost, of the MAP's utilization of the offered resource.

6. The vehicle communication network of claim 1, wherein the at least one MAP module of the MAP is operable to determine whether to request the offered resource by comparing the offered cost to a cost objective.

7. The vehicle communication network of claim 6, wherein the at least one MAP module of the MAP is operable to determine the cost objective based on an amount of time remaining to perform the communication.

8. The vehicle communication network of claim 6, wherein the at least one MAP module of the MAP is operable to determine the cost objective based on whether the communication is a real-time communication or a delay-tolerant communication.

9. The vehicle communication network of claim 1, wherein the at least one MAP module of the MAP is operable to determine whether to request the offered resource based on location and/or trajectory of the MAP.

10. A first node of a vehicle communication network, the first node comprising:
- at least one communication circuit; and
- at least one module comprising a processor and memory, the at least one module operable to, at least:
  - identify an offered resource that is available for utilization;
  - determine an offered cost associated with the offered resource;
  - utilize the at least one communication circuit to transmit a first message comprising information describing the offered resource and the offered cost;
  - receive a second message from a Mobile Access Point (MAP) of the vehicle communication network requesting the offered resource; and
  - in response to the received second message, at least:
    - allocate the offered resource to the MAP; and
    - utilize the at least one communication circuit to provide a wireless communication service to the MAP utilizing the allocated resource;
  - wherein one or both of the identifying of the offered resource and the determining the offered cost are based on mobility information associated with one or both of the first node and the MAP.

11. The first node of claim 10, wherein the first node comprises a fixed access point of the vehicle communication network.

12. The first node of claim 10, wherein the at least one module is operable to determine whether to transmit the first message based on a location and/or trajectory of the MAP.

13. The first node of claim 10, wherein the at least one module is operable to determine the cost associated with the offered resource based on a communication network load balancing objective.

14. The first node of claim 10, wherein the at least one module is operable to determine the cost associated with the offered resource based on a vehicle and/or vehicle fleet with which the MAP is associated.

15. The first node of claim 10, wherein the at least one module is operable to determine the cost associated with the offered resource based on whether the offered resource is being offered for real-time communication or delay-tolerant communication.

16. The first node of claim 10, wherein:
- the offered resource comprises a communication link; and
- the information describing the offered resource comprises communication link bandwidth information and communication link quality information.

17. The first node of claim 10, wherein the at least one module is operable to, in response to the received second message, at least:
- grant the offered resource to the MAP;
- monitor use of the resource by the MAP; and
- determine a charged cost, different from the offered cost, of the MAP's utilization of the offered resource.

18. A Mobile Access Point (MAP) of a vehicle communication network, the MAP comprising:
- at least one wireless communication circuit;
- at least one module comprising a processor and memory, the at least one module operable to, at least:
  - identify a needed resource that is needed by the MAP for performing a communication;
  - receive a first message transmitted by a first node of the vehicle communication network, the first message comprising information describing an offered resource and an offered cost associated with the offered resource;
  - determine, based on the needed resource, the offered resource, and the offered cost, whether to request the offered resource; and
  - if the at least one module determined to request the offered resource, then at least:
    - utilize the at least one wireless communication circuit to transmit a second message to the first node requesting the offered resource; and
    - utilize the at least one wireless communication circuit to perform the communication;
  - wherein one or both of the identifying of the needed resource and the determining whether to request the offered resource are based on mobility information associated with one or both of the first node and the MAP.

19. The Mobile Access Point (MAP) of claim 18, wherein the at least one module is operable to determine whether to request the offered resource by comparing the offered cost to a cost objective.

20. The Mobile Access Point (MAP) of claim 19, wherein the at least one module is operable to determine the cost objective based on an amount of time remaining to perform the communication.

21. The Mobile Access Point (MAP) of claim 19, wherein the at least one module is operable to determine the cost objective based on historical cost of the needed resource.

22. The Mobile Access Point (MAP) of claim 19, wherein the at least one module is operable to determine the cost objective based on whether the communication is a real-time communication or a delay-tolerant communication.

23. The Mobile Access Point (MAP) of claim 18, wherein the at least one module is operable to determine whether to request the offered resource based on location and/or trajectory of the MAP.

24. The Mobile Access Point (MAP) of claim 18, wherein the at least one module is operable to:
- monitor utilization of the offered resource by the MAP; and
- determine a usage cost, different from the offered cost, for the MAP's utilization of the offered resource.

25. The Mobile Access Point (MAP) of claim 18, wherein the at least one module is operable to asynchronously send a message requesting the needed resource without first receiving the first message.

* * * * *